(12) United States Patent
Kweon et al.

(10) Patent No.: US 6,372,385 B1
(45) Date of Patent: Apr. 16, 2002

(54) ACTIVE MATERIAL FOR POSITIVE ELECTRODE USED IN LITHIUM SECONDARY BATTERY AND METHOD OF MANUFACTURING SAME

(75) Inventors: Ho-jin Kweon; Sung-soo Kim; Geun-bae Kim, all of Chungcheong-namdo; Dong-gon Park, Seoul, all of (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/248,202

(22) Filed: Feb. 10, 1999

(30) Foreign Application Priority Data

| Feb. 10, 1998 | (KR) | ............................................... 98-3755 |
| Apr. 6, 1998 | (KR) | ............................................. 98-12005 |
| Oct. 14, 1998 | (KR) | ............................................. 98-42956 |

(51) Int. Cl.[7] .......................... H01M 4/58; H01M 4/32; H01M 4/50
(52) U.S. Cl. ............................. 429/231.95; 429/218.1; 429/223; 429/224; 429/231.3; 429/231.6
(58) Field of Search ......................... 429/231.95, 218.1, 429/223, 224, 231.3, 231.6

(56) References Cited

U.S. PATENT DOCUMENTS

| 4,302,518 | A | * | 11/1981 | Goodenough et al. | ...... 429/104 |
| 4,315,976 | A | * | 2/1982 | Conte | .......................... 429/194 |
| 4,610,866 | A | * | 9/1986 | Debsikdar et al. | .......... 423/600 |
| 5,160,712 | A | * | 11/1992 | Thackeray et al. | .......... 423/138 |
| 5,238,760 | A | * | 8/1993 | Takahashi et al. | .......... 429/194 |
| 5,264,201 | A | * | 11/1993 | Dahn et al. | ................. 423/594 |
| 5,350,647 | A | * | 9/1994 | Hope et al. | ................. 429/218 |
| 5,955,051 | A | * | 9/1999 | Li et al. | ..................... 423/594 |

* cited by examiner

Primary Examiner—Steven P. Griffin
Assistant Examiner—Jonas N. Strickland
(74) Attorney, Agent, or Firm—Blakely Sokoloff Taylor & Zafman

(57) ABSTRACT

Disclosed is active material for a positive electrode used in lithium secondary batteries of Formula 1 below and a method manufacturing the same, a surface of the active material being coated with metal oxide. The method includes the steps of producing a crystalline powder or a semi-crystalline powder of Formula 1; coating the crystalline powder or the semi-crystalline powder with metal alkoxide sol; and heat-treating the powder coated with the metal alkoxide sol.

$$LiA_{1-x-y}B_xC_yO_2 \qquad \text{(Formula 1)}$$

where $0 < x \leq 0.3$, $0 \leq y \leq 0.01$, and

A is an element selected from the group consisting of Ni, Co and Mn; B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

6 Claims, 18 Drawing Sheets

ACTIVE MATERIAL FOR POSITIVE ELECTRODE USED IN LITHIUM SECONDARY BATTERY AND METHOD OF MANUFACTURING SAME

BACKGROUND OF THE INVENTION (a) Field of the Invention

The present invention relates to lithium secondary batteries. More particularly, the present invention relates to active material for a positive electrode used in lithium second batteries and a method of manufacturing the same in which structural and thermal stability of the active material are improved, thereby greatly enhancing the overall safety of the battery.

(b) Description of the Related Art

With the proliferation in the use of portable electronic devices in recent times, coupled with advancements made enabling increasingly smaller sizes and weights for these devices, research is being actively pursued to improve energy density capabilities of lithium secondary batteries.

Lithium secondary batteries utilize material that is able to undergo lithium ion intercalation and deintercalation respectively for a negative electrode and a positive electrode, and are filled with organic electrolyte or polymer electrolyte, which enable movement of lithium ions inside the battery (i.e., back to the negative electrode in the form of an ionic current). The lithium secondary battery generates electrical energy by processes of oxidation and reduction which take place when lithium ions undergo intercalation and deintercalation in the negative electrode and the positive electrode, respectively.

In the past, although lithium metal was used as the negative electrode active material in lithium secondary batteries, a serious problem of dendrite forming on a surface of the lithium metal resulted during charging and discharging. This may cause a short circuit, or more seriously may lead to the explosion of the battery. To prevent such problems, carbonaceous material is now widely used for the negative active material. Carbonaceous material is able to alternatingly either receive or supply lithium ions while maintaining its structural integrity and electrical properties, and half of a potential of the cell is identical to that of lithium metal during insertion and separation of ions.

For the active material of the positive electrode in secondary batteries, a metal chalcogenide compound, enabling insertion and separation of lithium ions, is generally used, i.e. composite metal oxides such as $LiCoO_2$, $LiMn_2O_4$, $LiNiO_2$, $LiNi_{1-x}Co_xO_2$ ($0<X<1$), and $LiMnO_2$. Regarding the advantages and disadvantages of these different materials: the Mn-based active materials, $LiMn_2O_4$, and $LiMnO_2$, can easily synthesize, are less expensive than the other materials and give minimal negative affects on the environment, but capacities of these materials are low; $LiCoO_2$ is widely used as it exhibits an electrical conductivity of roughly $10^{-2}$ to 1 S/cm at room temperature, provides a high level of battery voltage, and has exceptional electrode characteristics, but is unsafe when charging or discharging at a high rate, and is more costly than the other materials; and $LiNiO_2$ has a high discharge and charge capacity and is the least expensive of the above active materials for the positive electrode, but does not synthesize easily.

Generally, such composite metal oxides are manufactured by mixing with a solid raw material powder, and this mixture undergoes a solid phase reaction for providing plasticity to the mixture. For example, Japanese Laid-open Publication No. Heisei 8-153513 (Sony Corp.) discloses a method for manufacturing $LiNi_{1-x}Co_xO_2$ ($0<X<1$) in which after a hydroxide containing $Ni(OH)_2$ and $Co(OH)_2$ or Ni and Co is mixed and heat treated, the hydroxide is ground and fractionated to diameter sizes of the particles. In another method, LiOH, Ni oxide and Co oxide are reacted, and after undergoing a first sintering at 400 to 580° C. to form an oxide, a second sintering is performed at 600 to 780° C. to manufacture a perfect crystalline active material.

However, in such conventional methods, the resulting active material has a low degree of both structural and thermal stability, reducing the safety of the battery.

SUMMARY OF THE INVENTION

The present invention has been made in an effort to fulfill the above need.

It is an object of the present invention to provide active material for a positive electrode used in lithium secondary batteries in which the active material has a high degree of structural and thermal stability.

It is another object of the present invention to provide a method of manufacturing the active material having the above characteristics.

To achieve the above objects, the present invention provides active material for a positive electrode used in lithium secondary batteries of Formula 1 below in which crystalline powder or semi-crystalline powder of Formula 1 is manufactured, and after coating the crystalline powder or semi-crystalline powder with metal alkoxide sol, the coated powder is heated, thereby producing an active material that is coated with a metal oxide on its surface.

$LiA_{1-x-y}B_xC_yO_2$ 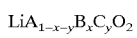 (Formula 1)

where $0<x\leq0.3$, and $0\leq y\leq0.01$.

In the Formula 1 above, A is an element selected from the group consisting of Ni, Co and Mn; B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Figure 1A:
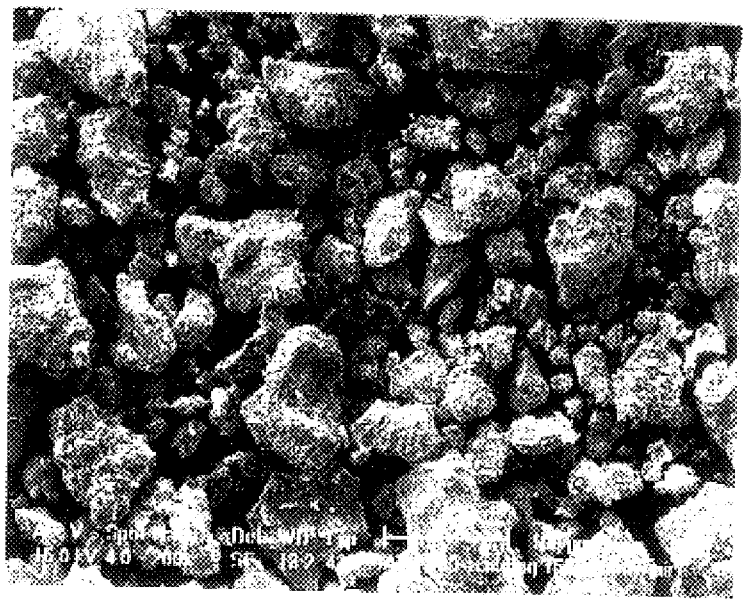
FIGS. 1a and 1b are SEM pictures of active material for a positive electrode used in secondary lithium batteries according to a first example of the present invention.

The present invention relates to active material for a positive electrode used in lithium secondary batteries of Formula 1 below in which crystalline powder or semi-crystalline powder of Formula 1 is manufactured, and after coating the crystalline powder or semi-crystalline powder with metal alkoxide sol, the coated powder is heated, thereby producing an active material that is coated with a metal oxide on its surface.

$$LiA_{1-x-y}B_xC_yO_2 \qquad \text{(Formula 1)}$$

where $0<x\leq0.3$, and $0\leq y\leq0.01$.

In the Formula 1 above, A is an element selected from the group consisting of Ni, Co and Mn; B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

To synthesize a crystalline or a semi-crystalline powder of $LiA_{1-x-y}B_xC_yO_2$ (where $0<x\leq0.3$; $0\leq y \leq0.01$; A is an element selected from the group consisting of Ni, Co and Mn; B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al), a uniform mixture of an A, B, C metal salt is produced by mixing metal A with metal B to an equivalent ratio between 70:30 and 100:0, and a small amount of metal C is added to the mixture. Here, it is possible for metal C to not be added to the mixture. With regard to the ratio between metal A and metal B, if an equivalent ratio of metal B exceeds 30%, as changes occur in a crystalline structure of the resulting positive electrode active material, lithium ion intercalation and deintercalation are not smoothly realized.

In order to uniformly mix the A, B, C metal salt powder, it is preferable that the A, B, C salt is evenly dispersed in a suitable solvent such that a mixed solution is produced, and that the mixed solution undergoes an attritor milling process. For the solvent, it is possible to use water, alcohol or acetone, and it is preferable that the above metal salts are not dissolved in the solvent. Attritor milling refers to agitating (the A, B, C metal salt dispersed in the solvent in this case) using an agitator. Here, a sufficient speed and agitation time (e.g., 400 to 500 rpm for roughly 1 hour) is used to ensure the metal salt powder is uniformly mixed.

It is preferable to use nickel salt such as nickel hydroxide, nickel nitrite, or nickel acetate for the A metal salt; for the B metal salt, it is preferable to use cobalt salt such as cobalt hydroxide, cobalt nitride or cobalt carbonate; and for the C metal salt it is preferable to use aluminum hydroxide or strontium hydroxide.

After drying the solvent, in which the mixed powder is uniformly dispersed, in a drying furnace at a temperature of approximately 120° C. for roughly 24 hours, the resulting material is neatly ground, thereby producing a $A_{1-x-y}B_xC_yO_2(OH)_2$ powder. A lithium salt is added to the produced powder at a desired equivalent ratio and mechanically mixed therein. For example, the mixture of the lithium salt and $A_{1-x-y}B_xC_yO_2(OH)_2$ is produced by performing a mortar grinder mixing operation.

For the lithium salt, although any chemical can be used which reacts with $A_{1-x-y}B_xC_yO_2(OH)_2$, it is preferable to use lithium nitrite, lithium acetate or lithium hydroxide. At this time, to accelerate the reaction between the lithium salt and $A_{1-x-y}B_xC_yO_2(OH)_2$, it is preferable that a suitable solvent such as ethanol, methanol, water or acetone is added, and the mortar grinder mixing operation is performed until the mixture is solvent-free.

The mixture of the lithium salt and $A_{1-x-y}B_xC_yO_2(OH)_2$ produced by the above process is heat-treated at a temperature between 400 and 600° C., thereby producing a $LiA_{1-x-y}B_xC_yO_2$ powder (i.e., an active material precursor for positive electrodes), the powder being in a semi-crystalline state.

In another method, the mixture of the produced lithium salt and $A_{1-x-y}B_xC_yO_2(OH)_2$ undergoes a first heat-treating process for 1–5 hours at a temperature between 400 and 550° C., and a second heat-treating process for 10–15 hours at a temperature between 700 and 900° C., thereby producing a $LiA_{1-x-y}B_xC_yO_2$ powder (i.e., an active material precursor for a positive electrode), the powder being in a crystalline state. If the temperature is below 400° C. for the first heat-treating process, a sufficient level of reaction with the lithium salt is not realized, and if the temperature is below 700° C. for the second heat-treating process, it is difficult to form the crystalline material of Formula 1. Further, the first and second heat-treating processes are performed in a state where air is being blown and the temperature is increased at a rate of 1–5° C./minute. After heat-treating for the lengths of times described above, the mixture is naturally cooled. Preferably, the crystalline or semi-crystalline $LiA_{1-x-y}B_xC_yO_2$ powder is remixed at a high temperature so that a more uniform mixing of the lithium salt is attained.

Subsequently, the crystalline or semi-crystalline $LiA_{1-x-y}B_xC_yO_2$ powder is coated with metal alkoxide sol. At this time, it is preferable that a dip coating method is used as it is simple to execute, although it is possible to use other typically applied methods such as a sputtering method or a CVD (chemical vapor deposition) method. The metal alkoxide sol is produced by mixing metal with alcohol at 1–10% by weight of the alcohol, then refluxing the mixture. Mg, Al, Co, K, Na or Ca, preferably Mg, is used for the metal in the metal alkoxide sol; and either methanol or ethanol can be used for the alcohol in the mixture. If a concentration of the metal is less than 1% by weight, advantageous effects of coating the metal alkoxide sol on the $LiA_{1-x-y}B_xC_yO_2$ powder are not obtained, while if the concentration of the metal exceeds 5% by weight, a layer formed by the metal alkoxide sol on the powder becomes too thick.

Following the above, the crystalline or semi-crystalline powder coated with metal alkoxide sol is dried in an oven set at 120° C. for roughly 5 hours. This drying process acts to more uniformly disperse the lithium salt in the powder. Next, the crystalline or semi-crystalline $LiA_{1-x-y}B_xC_yO_2$ powder coated with metal alkoxide sol is heat-treated for 8–15 hours at a temperature between 400 and 900° C. That is, in the case where the powder is crystalline, it is preferable that the heat-treating temperature is set between 400 and 600° C., whereas the preferable temperature is between 700 and 900° C. in the case where the powder is semi-crystalline.

By the above heat-treating process, the metal alkoxide sol changes to a metal oxide, and the semi-crystalline $LiA_{1-x-y}B_xC_yO_2$ powder changes to a crystalline powder, resulting in the production of positive electrode active material of Formula 1 in which metal oxide is coated on a surface of a crystalline $LiA_{1-x-y}B_xC_yO_2$ powder. The metal oxide formed on the surface of the active material can be either a composite metal oxide obtained from at least one of the A, B or C metals and the metal alkoxide, or a metal oxide obtained from only the metal alkoxide. For example, by heat-treating $LiCoO_2$ after coating the same with aluminum alkoxide, a positive electrode active material of a composite metal oxide of cobalt and aluminum, and/or a positive electrode active material on a surface of which aluminum oxide is processed can be obtained. To produce a more uniform crystalline active material, it is preferable for dry air or oxygen to be blown during the heat-treating process. At this time, if the heat-treating temperature is below 400° C., since the coated metal alkoxide sol does not become crystallized, use of the resulting active material in a battery causes interference of movement of lithium ions therein.

In the positive electrode active material produced as in the above, since minute particles are in an agglomerated state, particle size of the active material is between 0.1 and 100 $\mu$m.

The present invention will now be described in detail.

Example 1

$Ni(OH)_2$ powder (Tanaka Co. of Japan) and $Co(OH)_2$ (Kojyundo Chemical of Japan) powder were mixed to an equivalent ratio of 0.8/0.2 and dispersed in water, after which the mixture underwent an attritor milling process for approximately 60 minutes at 450 rpm to uniformly mix the mixture. Next, after drying the mixed powder dispersed in water in a drying oven at 120° C. for approximately 24 hours, the resulting dry mixture was evenly ground, thereby producing $Ni_{0.8}Co_{0.2}(OH)_2$. LiOH (Junsei Co. of Japan) was added to the $Ni_{0.8}Co_{0.2}(OH)_2$ to provide 1 equivalent weight of lithium and the mixture underwent mortar grinder mixing such that a $Ni_{0.8}Co_{0.2}(OH)_2$ mixture was produced.

After the above, the mixture was heat-treated at 500° C. for approximately 5 hours, thereby producing a $LiNi_{0.8}Co_{0.2}O_2$ powder. The semi-crystalline $LiNi_{0.8}Co_{0.2}O_2$ powder was then dip-coated in a Mg-methoxide sol, produced by refluxing Mg of 4% by weight of methanol, after which the Mg-methoxide coated semi-crystalline powder was remixed at a high temperature in a state where dry air was being blown thereon. Accordingly, the lithium salt was uniformly dispersed. The resulting material was then heat-treated for 12 hours at 750° C. in a state where dry air was blown thereon, thereby producing crystalline active material for a positive electrode used in lithium secondary batteries.

The active material manufactured as in the above, conductive material (carbon, product name: Super P), a binder (polyvinylidene fluoride, product name: KF-1300) and a solvent (N-methyl pyrrolidone) were mixed to produce an active material composite slurry for a positive electrode. The slurry was then cast into a tape shape to manufacture a positive electrode. Using this positive electrode, Li-metal as a counterpart electrode, electrolyte including both a mixture of ethylene carbonate and dimethyl carbonate at a 1:1 volume ratio, and $LiPF_6$, a coin cell-type half cell was manufactured.

Example 2

Except for adding ethanol to accelerate the reaction between LiOH and $Ni_{0.8}Co_{0.2}(OH)_2$ and performing mortar grinder mixing until nearly all the acetone was no longer present in the mixture (a solvent-free state), the same method as that used in Example 1 above was used to produce positive electrode active material for a lithium secondary battery and to manufacture a coin cell-type half cell.

Example 3

After producing a mixture of lithium salt and $Ni_{0.8}Co_{0.2}(OH)_2$, except for heat-treating the mixture for approximately five hours at 600° C. to produce a semi-crystalline $LiNi_{0.8}Co_{0.2}O_2$ powder, the same method as that used in Example 1 above was used to produce positive electrode active material for a lithium secondary battery and to manufacture a coin cell-type half cell.

Example 4

After producing a mixture of lithium salt and $Ni_{0.8}Co_{0.2}(OH)_2$, except for heat-treating the mixture for approximately five hours at 600° C. to produce a semi-crystalline $LiNi_{0.8}Co_{0.2}O_2$ powder, the same method as that used in Example 2 above was used to produce positive electrode active material for a lithium secondary battery and to manufacture a coin cell-type half cell.

Example 5

$Ni(OH)_2$ (Tanaka Co. of Japan) and $Co(OH)_2$ (Kojyundo Chemical of Japan) were mixed to an equivalent ratio of 0.8/0.2 and dispersed in water, after which the mixture underwent an attritor milling process for approximately 60 minutes at 450 rpm to uniformly mix the mixture. Next, after drying the mixed powder dispersed in water in a drying oven at 120° C. for approximately 24 hours, the resulting dry mixture was evenly ground, thereby producing $Ni_{0.8}Co_{0.2}(OH)_2$. LiOH (Junsei Co. of Japan) was added to the $Ni0.8Co_{0.2}(OH)_2$ to provide 1 equivalent weight of lithium, and ethanol was added to accelerate a reaction between the LiOH and $NiO_{0.8}Co_{0.2}(OH)_2$, after which the mixture underwent mortar grinder mixing until almost all the ethanol was no longer present in the mixture.

After the above, the fully-mixed mixture was placed in an aluminous crucible and heat-treated at 400° C. in a state where dry air was blown on the mixture, then again heat-treated for 12 hours at 750° C. In both the heat-treating processes, the temperature was raised at a rate of 3° C./min., and after reaching the target temperatures (400° C. and 750° C.) and maintaining this state for a predetermined time, the mixture was naturally cooled to produce a $LiNi_{0.8}Co_{0.2}O_2$ powder.

The $LiNi_{0.8}Co_{0.2}O_2$ powder produced as in the above was then dipped in Mg-methoxide sol for approximately 10 minutes, then removed from the sol solution. Subsequently, the powder was dried in an oven set at 120° C. for approximately 5 hours, thereby producing $LiNi_{0.8}Co_{0.2}O_2$ powder coated with the Mg-methoxide. The powder was then heat-treated at a temperature of 500° C. for approximately 10 hours in a state where dry air was blown on the powder, thereby completing the production of the active material for positive electrodes used in lithium secondary batteries.

Using the positive electrode active material manufactured as in the above, a coin cell-type half cell was manufactured according to the method used in Example 1.

Example 6

Except for mixing $Ni(OH)_2$ (Tanaka Co. of Japan) and $Co(OH)_2$ (Kojyundo Chemical of Japan) to an equivalent ratio of 0.9/0.1 to result in positive electrode active material having a formula of $LiNi_{0.9}Co_{0.1}O_2$, the same method as that used in Example 5 above was used to manufacture a half cell.

Example 7

Except for heat-treating the $LiNi_{0.8}Co_{0.2}O_2$ powder at 600° C., the same method as that used in Example 5 above was used to manufacture positive electrode active material and a half cell.

Example 8

Except for heat-treating the $LiNi_{0.9}Co_{0.1}O_2$ powder at 600° C., the same method as that used in Example 6 above was used to manufacture positive electrode active material and a half cell.

Example 9

LiOH (Junsei Co. of Japan) and $Co(OH)_2$ (Kojyundo Chemical of Japan) were mixed to a 1:1 mole ratio. After adding an amount of ethanol to this mixture sufficient to induce thorough reaction of the two chemicals, the mixture was mixed in a mechanical mortar mixer for approximately 1 hour, or until nearly all the solvent was no longer present in the powder mixture.

Next, the fully-mixed powder was placed in an aluminous crucible and heat-treated for 5 hours at 400° C. in a state where dry air was blown on the mixture, then again heat-treated for 12 hours at 750° C. In both the heat-treating processes, the temperature was raised at a rate of 3° C./min., and after reaching the target temperatures (400° C. and 750° C.) and maintaining this state for a predetermined time, the mixture was naturally cooled to produce a crystalline $LiCoO_2$ powder.

The $LiCoO_2$ powder produced as in the above was then dipped in Mg-methoxide sol for approximately 10 minutes, then removed from the sol solution. Subsequently, the powder was dried in an oven set at 120° C. for approximately 5 hours, thereby producing $LiCoO_2$ powder coated with the Mg-methoxide. The powder was then heat-treated at a temperature of 600° C. for approximately 10 hours in a state where dry air was blown on the powder, thereby completing the production of the active material for positive electrodes used in lithium secondary batteries.

Using the positive electrode active material manufactured as in the above, a coin cell-type half cell was manufactured according to the method used in Example 1.

Example 10

Except for heat-treating the $LiCoO_2$ powder coated with the Mg-methoxide at a temperature of 700° C., the same method as that used in Example 9 above was used to manufacture positive electrode active material and a half cell.

Example 11

Except for heat-treating the $LiNi_{0.8}Co_{0.2}O_2$ powder coated with the Mg-methoxide at a temperature of 700° C., the same method as that used in Example 5 above was used to manufacture positive electrode active material and a half cell.

Example 12

$Ni(OH)_2$ (Tanaka Co. of Japan), $Co(OH)_2$ (Kojyundo Chemical of Japan), and $Al(OH)_3$ were mixed to an equivalent ratio of 0.8/0.15/0.05 and dispersed in water, after which the mixture underwent an attritor milling process for approximately 60 minutes at 450 rpm to uniformly mix the mixture. Next, after drying the mixed powder dispersed in water in a drying oven at 120° C. for approximately 24 hours, the resulting dry mixture was evenly ground, thereby producing $Ni_{0.8}Co_{0.15}Al_{0.05}(OH)_2$. LiOH (Junsei Co. of Japan) was added to the $Ni_{0.8}Co_{0.15}Al_{0.05}(OH)_2$ to provide 1 equivalent weight of lithium, and ethanol was added to accelerate a reaction between the LiOH and $Ni_{0.8}Co_{0.15}Al_{0.05}(OH)_2$, after which the mixture underwent mortar grinder mixing until almost all the ethanol was no longer present in the mixture (i.e., until the mixture was solvent-free).

After the above, the fully-mixed mixture was placed in an aluminous crucible and heat-treated at 400° C. in a state where dry air was blown on the mixture, then again heat-treated for 12 hours at 750° C. In both the heat-treating processes, the temperature was raised at a rate of 3° C./min., and after reaching the target temperatures (400° C. and 750° C.) and maintaining this state for a predetermined time, the mixture was naturally cooled to produce a $Ni_{0.8}Co_{0.15}Al_{0.05}(OH)_2$ powder.

The $Ni_{0.8}Co_{0.15}Al_{0.05}(OH)_2$ powder produced as in the above was then dipped in Mg-methoxide sol for approximately 10 minutes, then removed from the sol solution. Subsequently, the powder was dried in an oven set at 120° C. for approximately 5 hours, thereby producing $Ni_{0.8}Co_{0.15}Al_{0.05}(OH)_2$ powder coated with the Mg-methoxide. The powder was then heat-treated at a temperature of 700° C. for approximately 10 hours in a state where dry air was blown on the powder, thereby completing the production of the active material for positive electrodes used in lithium secondary batteries.

Using the positive electrode active material manufactured as in the above, a coin cell-type half cell was manufactured according to the method used in Example 1.

Example 13

$Ni(OH)_2$ (Tanaka Co. of Japan), $Co(OH)_2$ (Kojyundo Chemical of Japan), and $Sr(OH)_2$ were mixed to an equivalent ratio of 0.9/0.0985/0.002 and dispersed in water, after which the mixture underwent an attritor milling process for approximately 60 minutes at 450 rpm to uniformly mix the mixture. Next, after drying the mixed powder dispersed in water in a drying oven at 120° C. for approximately 24 hours, the resulting dry mixture was evenly ground, thereby producing $Ni_{0.9}Co_{0.098}Sr_{0.002}(OH)_2$. LiOH (Junsei CID. of Japan) was added to the $Ni_{0.9}Co_{0.098}Sr_{0.002}(OH)_2$ to provide 1 equivalent weight of lithium, and ethanol was added to accelerate a reaction between the LiOH and $Ni_{0.9}Co_{0.098}Sr_{0.002}(OH)_2$, after which the mixture underwent mortar grinder mixing until almost all the ethanol was no longer present in the mixture (i.e., until the mixture was solvent-free).

After the above, the fully-mixed mixture was placed in an aluminous crucible and heat-treated at 400° C. in a state where dry air was blown on the mixture, then again heat-treated for 12 hours at 750° C. In both the heat-treating processes, the temperature was raised at a rate of 3° C./min., and after reaching the target temperatures (400° C. and 750° C.) and maintaining this state for a predetermined time, the mixture was naturally cooled to produce a $Ni_{0.9}Co_{0.098}Sr_{0.002}(OH)_2$.

The $Ni_{0.9}Co_{0.098}Sr_{0.002}(OH)_2$ powder produced as in the above was then dipped in Mg-methoxide sol for approximately 10 minutes, then removed from the sol solution. Subsequently, the powder was dried in an oven set at 120° C. for approximately 5 hours, thereby producing $Ni_{0.9}Co_{0.098}Sr_{0.0098}(OH)_2$ powder coated with the Mg-methoxide. The powder was then heat-treated at a temperature of 700° C. for approximately 10 hours in a state where dry air was blown on the powder, thereby completing the production of the active material for positive electrodes used in lithium secondary batteries.

Using the positive electrode active material manufactured as in the above, a coin cell-type half cell was manufactured according to the method used in Example 1.

Example 14

$LiCoO_2$ powder (NC-5 produced by Nippon Chemical of Japan) was dipped in Mg-methoxide sol for approximately 10 minutes, then removed from the sol solution. This powder was then dried in an oven set to 120° C. for approximately 5 hours, thereby producing $LiCoO_2$ powder coated with Mg-methoxide. The $LiCoO_2$ powder coated with Mg-methoxide subsequently was heat-treated for approximately 10 hours at 600° C. in a state where dry air was blown on the powder to produce active material for a positive electrode used in lithium-ion batteries.

Example 15

$LiCoO_2$ powder (NC-5 produced by Nippon Chemical of Japan) was dipped in Al-isopropoxide sol for approximately 10 minutes, then removed from the sol solution. This powder was then dried in an oven set to 120° C. for approximately 5 hours, thereby producing $LiCoO_2$ powder coated with Mg-methoxide. The $LiCoO_2$ powder coated with Al-isopropoxide subsequently was heat-treated for approximately 10 hours at 600° C. in a state where dry air was blown on the powder to produce active material for a positive electrode used in lithium-ion batteries.

Example 16

$LiCoO_2$ powder (NC-10 produced by Nippon Chemical of Japan) was dipped in Mg-methoxide sol for approximately 10 minutes, then removed from the sol solution. This powder was then dried in an oven set to 120° C. for approximately 5 hours, thereby producing $LiCoO_2$ powder coated with Mg-methoxide. The $LiCoO_2$ powder coated with Mg-methoxide subsequently was heat-treated for approximately 10 hours at 600° C. in a state where dry air was blown on the powder to produce active material for a positive electrode used in lithium-ion batteries.

The active material manufactured as in the above, conductive material (carbon, product name: Super P), a binder (polyvinylidene fluoride, product name: KF-1300) and a solvent (N-methyl pyrrolidone) were mixed to produce an active material composite slurry for a positive electrode. The slurry was then cast into a tape shape to manufacture a positive electrode.

Using this positive electrode; a negative electrode of MCF (meso carbon fiber) material; an organic electrolyte including 1M of $LiPF_6$ in a mixture of ethylene carbonate, dimethyl carbonate and diethyl carbonate at a 3:3:1 volume ratio; and the Ashai separator made of polypropylene, a 18650 cylindrical battery having a capacity of 1650 mAh was manufactured. Battery life characteristics of this battery were then measured by setting a 1C capacity to 1650 mAh and in a range between 2.75 and 4.2 V.

Example 17

$LiCoO_2$ powder (NC-5 produced by Nippon Chemical of Japan) was dipped in Al-isopropoxide sol for approximately 10 minutes, then removed from the sol solution. This powder was then dried in an oven set to 120° C. for approximately 5 hours, thereby producing $LiCoO_2$ powder coated with Al-isopropoxide. The $LiCoO_2$ powder coated with Al-isopropoxide subsequently was heat-treated for approximately 10 hours at 600° C. in a state where dry air was blown on the powder to produce active material for a positive electrode used in lithium-ion batteries.

Using this active material, a positive electrode and a battery were manufactured using the same method of Example 16.

Example 18

$Ni(OH)_2$ (Tanaka Co. of Japan) and $Co(OH)_2$ (Kojyundo Chemical of Japan) were mixed to an equivalent ratio of 0.8/0.2 and dispersed in water, after which the mixture underwent an attritor milling process for approximately 60 minutes at 450 rpm to uniformly mix the mixture. Next, after drying the mixed powder dispersed in water in a drying oven at 120° C. for approximately 24 hours, the resulting dry mixture was evenly ground, thereby producing $Ni_{0.8}Co_{0.2}(OH)_2$. LiOH (Junsei Co. of Japan) was added to the $Ni_{0.8}Co_{0.2}(OH)_2$ to provide 1 equivalent weight of lithium, and ethanol was added to accelerate a reaction between the LiOH and $Ni_{0.8}Co_{0.2}(OH)_2$, after which the mixture underwent mortar grinder mixing until almost all the ethanol was no longer present in the mixture (i.e., until a solvent-free mixture was obtained).

After the above, the fully-mixed mixture was placed in an aluminous crucible and heat-treated at 400° C. in a state where dry air was blown on the mixture, then again heat-treated for 12 hours at 750° C. In both the heat-treating processes, the temperature was raised at a rate of 3° C./min., and after reaching the target temperatures (400° C. and 750° C.) and maintaining this state for a predetermined time, the mixture was naturally cooled to produce a $LiNi_{0.8}Co_{0.2}O_2$ powder.

The $LiNi_{0.8}Co_{0.2}O_2$ powder produced as in the above was then dipped in Mg-methoxide sol for approximately 10 minutes, then removed from the sol solution. Subsequently, the powder was dried in an oven set at 120° C. for approximately 5 hours, thereby producing $LiNi_{0.8}Co_{0.2}O_2$ powder coated with the Mg-methoxide. The powder was then heat-treated at a temperature of 500° C. for approximately 10 hours in a state where dry air was blown on the powder, thereby completing the production of the active material for positive electrodes used in lithium secondary batteries.

The active material manufactured as in the above, conductive material (carbon, product name: Super P), a binder (polyvinylidene fluoride, product name: KF-1300) and a solvent (N-methyl pyrrolidone) were mixed to produce an active material composite slurry for a positive electrode. The slurry was then cast into a tape shape to manufacture a positive electrode.

Using this positive electrode; a negative electrode of MCF (meso carbon fiber) material; an organic electrolyte including 1M of $LiPF_6$ in a mixture of ethylene carbonate, dimethyl carbonate and diethyl carbonate at a 3:3:1 volume ratio; and the Ashai separator made of polypropylene, a 18650 cylindrical battery having a capacity of 1650 mAh was manufactured. Battery life characteristics of this battery were then measured by setting a 1C capacity to 1650 mAh and in a range between 2.75 and 4.2 V.

Comparative Example 1

Except for skipping the steps of coating the semi-crystalline $LiNi_{0.8}Co_{0.2}O_2$ powder with Mg-methoxide sol then heat-treating the coated powder, the same method as that used in Example 1, was used to manufacture positive electrode active material and a coin cell-type half cell.

Comparative Example 2

Except for skipping the steps of coating the semi-crystalline $LiNi_{0.8}Co_{0.2}O_2$ powder with Mg-methoxide sol then heat-treating the coated powder, the same method as that used in Example 2 was used to manufacture positive electrode active material and a coin cell-type half cell.

Comparative Example 3

Except for skipping the steps of coating the semi-crystalline $LiNi_{0.8}Co_{0.2}O_2$ powder with Mg-methoxide sol then heat-treating the coated powder, the same method as that used in Example 2 was used to manufacture positive electrode active material and a coin cell-type half cell.

Comparative Example 4

$Ni(OH)_2$ (Tanaka Co. of Japan), $Co(OH)_2$ (Kojyundo Chemical of Japan), and $Mg(OH)_2$ were mixed to an equivalent ratio of 0.8/0.15/0.05 and dispersed in water, after which the mixture underwent an attritor milling process for approximately 60 minutes at 450 rpm to uniformly mix the mixture. Next, after drying the mixed powder dispersed in water in a drying oven at 120° C. for approximately 24 hours, the resulting dry mixture was evenly ground, thereby producing $Ni_{0.8}Co_{0.15}Mg_{0.05}(OH)_2$. LiOH (Junsei Co. of Japan) was added to the $Ni_{0.8}Co_{0.15}Mg_{0.05}(OH)_2$ to provide 1 equivalent weight of lithium, and ethanol was added to accelerate a reaction between the LiOH and $Ni_{0.8}Co_{0.15}Mg_{0.05}(OH)_2$, after which the mixture underwent mortar grinder mixing until almost all the ethanol was no longer present in the mixture (i.e., until the mixture was solvent-free). Next, the fully-mixed mixture was placed in an aluminous crucible and heat-treated at 400° C. in a state where dry air was blown on the mixture, then again heat-treated for 12 hours at 750° C. to produce active material for a positive electrode used in lithium-ion batteries.

Using the positive electrode active material manufactured as in the above, a coin cell-type half cell was manufactured according to the method used in Example 1.

Comparative Example 5

Except for skipping the steps of coating the crystalline $LiCoO_2$ powder with Mg-methoxide sol then heat-treating the coated powder, the same method as that used in Example 9 was used to manufacture positive electrode active material and a coin cell-type half cell.

Comparative Example 6

Except for skipping the steps of coating the crystalline $LiNi_{0.8}Co_{0.2}O_2$ powder with Mg-methoxide sol then heat-treating the coated powder, the same method as that used in Example 11 was used to manufacture positive electrode active material and a coin cell-type half cell.

Comparative Example 7

Except for skipping the steps of coating the crystalline $LiNi_{0.8}Co_{0.2}O_2$ powder with Mg-methoxide sol then heat-treating the coated powder, the same method as that used in Example 12 was used to manufacture positive electrode active material and a coin cell-type half cell.

Comparative Example 8

Except for skipping the steps of coating the crystalline $LiNi_{0.9}Co_{0.098}Sr_{0.002}O_2$ powder with Mg-methoxide sol then heat-treating the coated powder, the same method as that used in Example 13 was used to manufacture positive electrode active material and a coin cell-type half cell.

Comparative Example 9

$LiCi_2$ powder (NC-5 of Nippon Chemical) was used as is for positive electrode active material in a lithium-ion battery.

Comparative Example 10

Except for skipping the step of processing the $LiCoO_2$ powder (NC-10 of Nippon Chemical) using Mg-methoxide sol such that the powder is used as is for positive electrode active material, the same method as that used in Example 16 was used.

Comparative Example 11

A battery as disclosed in the Matsushita Technical Journal Vol. 44, August 1998, pp. 407–412 was used for Comparative Example 10.

Comparative Example 12

Except for skipping the steps of coating the $LiNi_{0.8}Co_{0.2}O_2$ powder with Mg-methoxide sol and heat-treating the powder, the same method as that used in Example 17 was used to manufacture positive electrode active material and a 18650-type battery.

Figure 1B:
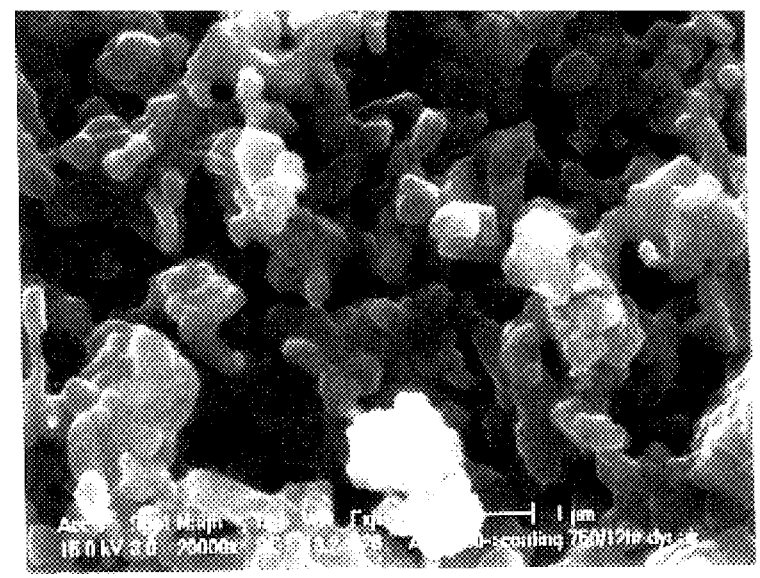
Figure 2A:
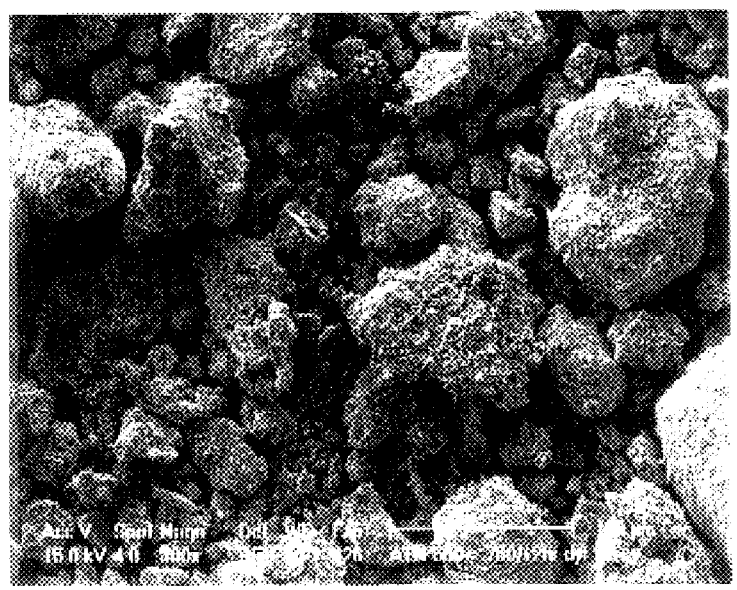
FIGS. 2a and 2b are SEM pictures of active material for a positive electrode used in secondary lithium batteries according to a first comparative example of the present invention.
Figure 2B:
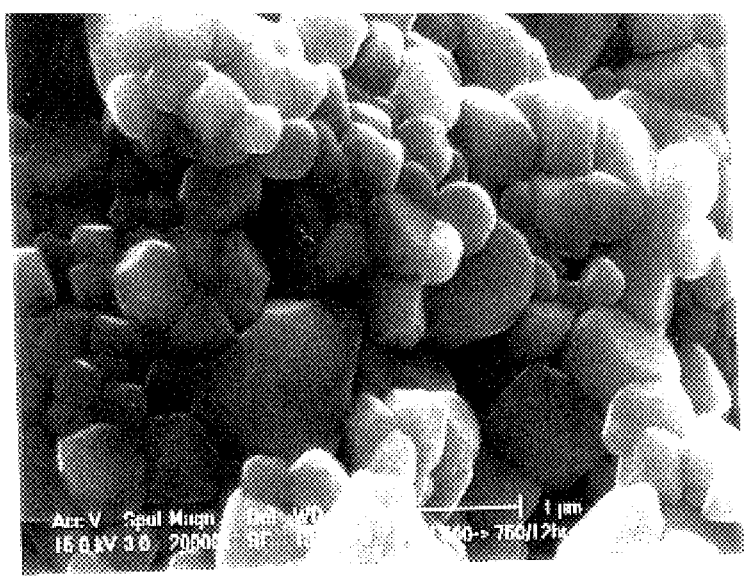

FIGS. 1a and 1b show SEM pictures, enlarged respectively 200-times and 20,000-times, of the active material manufactured according to Example 1 of the present invention; and FIGS. 2a and 2b show SEM pictures, enlarged respectively 300-times and 20,000-times, of the active material manufactured according to Comparative Example 1 of the present invention. As can be seen in FIGS. 1a and 2a, the active material manufactured according to Example 1 is comprised of clumps that are less than 100 µm in size, whereas the active material manufactured according to Comparative Example 1 is comprised of clumps that are greater than 100 µm in size. Further, as shown in FIG. 1b, the active material manufactured according to Example 1 is comprised of ultra-fine particles of 0.1–0.2 µm in size that mass together to form small particles of 0.5–1 µm in size. On the other hand, as shown in FIG. 2b, the active material manufactured according to Comparative Example 1 is comprised of particles that are 1 µm and larger in size that mass together into clumps.

Figure 3:
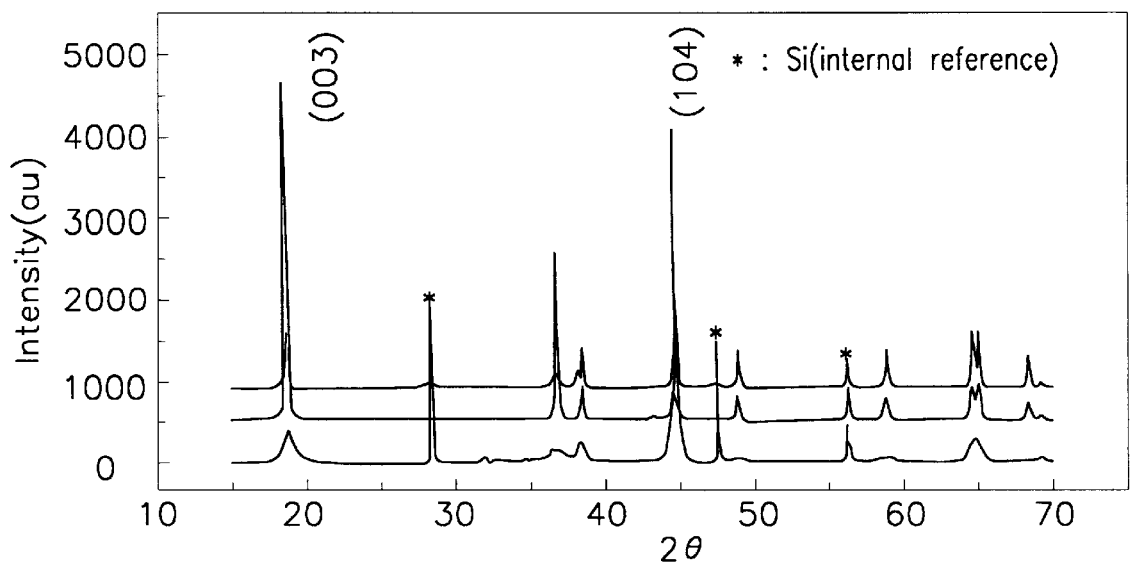
FIG. 3 is a graph illustrating XRD patterns of active material for a positive electrode used in secondary lithium batteries according to a second example and a second comparative example of the present invention.

FIG. 3 shows a graph of XRD patterns of the active material according to Example 2 and Comparative Example 2 of the present invention. As shown in the drawing, an XRD pattern (a in the drawing) of the $LiNi_{0.8}Co_{0.2}O_2$ powder produced by mixing LiOH and $Ni_{0.8}Co_{0.2}(OH)_2$ in the acetone solvent then heat-treated at a temperature of 500° C. is broad and has peaks that are not significantly high, indicative of a semi-crystalline state. Further, if the active material coated with Mg-methoxide undergoes the second heat-treating process as in Example 2, peaks of an XRD pattern of this active material (b in the drawing) are distinct and sharp, indicative of a fully-crystallized state. This XRD pattern is substantially identical to an XRD pattern (c in the drawing) of the crystalline active material of Comparative Example 2 in which Mg is not added. Accordingly, since the active material of Example 2 is able to maintain the structure of the active material in which Mg is not added, this indicates that the Mg-oxide does not permeate the crystalline structure of the active material, but, rather, only coats a surface of the crystalline structure. In FIG. 2, "*" indicates Si standard peaks.

Figure 4:
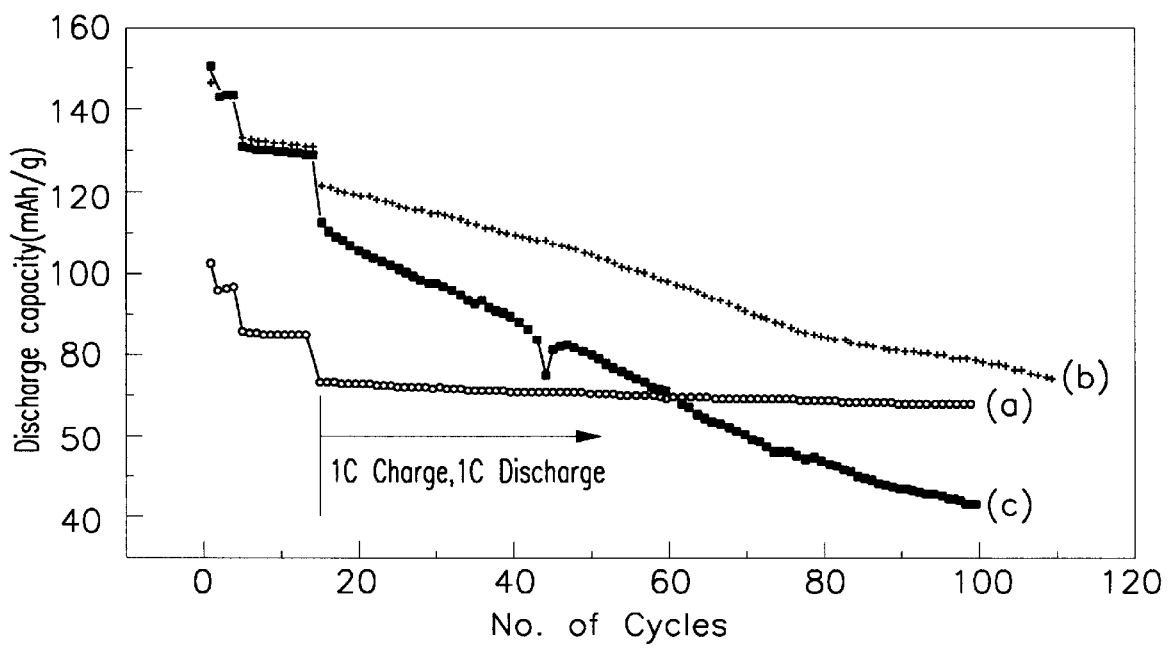
FIG. 4 is a graph illustrating charge and discharge characteristics of a battery to which is applied positive material according to the first example, the first comparative example and a third example of the present invention.

FIG. 4 shows a graph of charge and discharge characteristics of coin-type batteries manufactured according to Example 1 (a in the drawing), Example 3 (b in the drawing) and Comparative Example 1 (c in the drawing). A capacity and a battery life of each of the batteries were measured by charging/discharging the batteries, between 2.8V and 4.3V, to 0.1C for 1 cycle, 0.2C for 3 cycles, 0.5C for 10 cycles, and 1C for 85 cycles. As shown in FIG. 4, at a high rate of 1C charge and 1C discharge, the capacity of the battery using the active material of Example 1 reduced from 72.8 mAh/g to 66.8 mAh/g (approximately 8%) after 85 cycles; the capacity of the battery using the active material of Example 3 reduced from 122 mAh/g to 77.5 mAh/g (approximately 36%) after 85 cycles; and the capacity of the battery using the active material of Comparative Example 1 reduced from 111.9 mAh/g to 42.6 mAh/g (approximately 60%) after 85 cycles. Accordingly, it can be known that, compared to the battery using the prior active material, the battery utilizing the active material of the present invention is stable, has a limited amount capacity reduction and displays exceptional battery life characteristics at a high rate of charge and discharge.

Figure 5A:
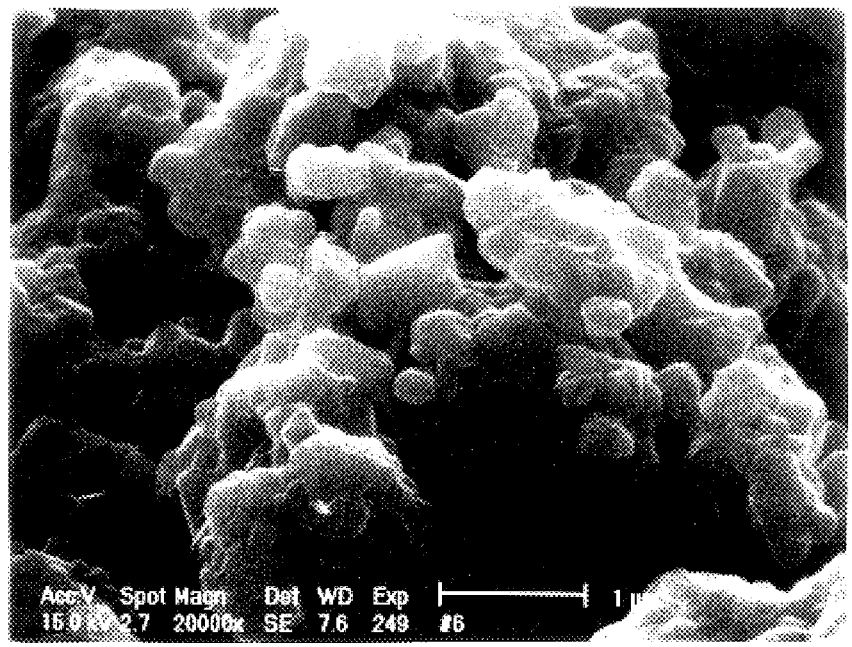
FIGS. 5a and 5b are SEM pictures of active material for a positive electrode used in secondary lithium batteries according to a fifth example and a third comparative example of the present invention, respectively.
Figure 5B:
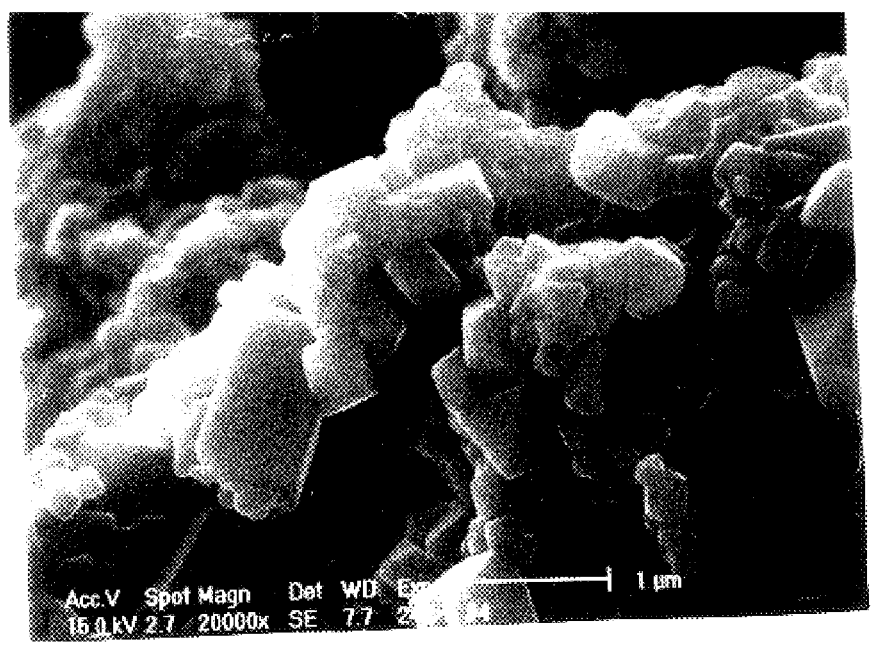

FIGS. 5a and 5b show SEM pictures of the active material powder according to Example 5 and Comparative Example 3, respectively. As shown in the drawing, the surface of the active material of Example 5 is formed differently from the surface of the active material of Comparative Example 3 as a result of the coating of the metal oxide over the active material of Example 5.

Figure 6:
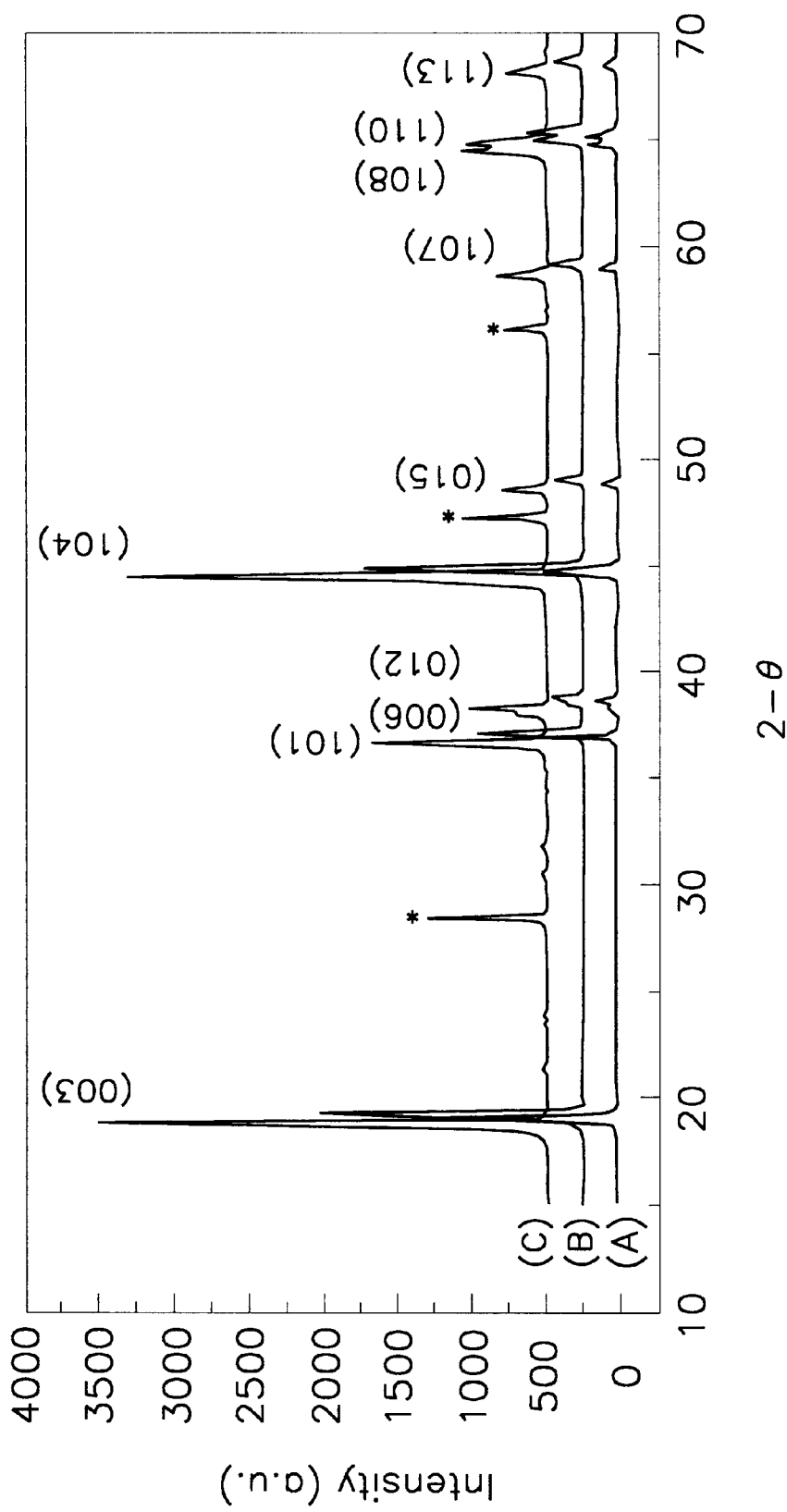
FIG. 6 is a graph illustrating XRD patterns of active material for a positive electrode used in secondary lithium batteries according to the fifth example, the third comparative example and a fourth comparative example of the present invention.

XRD patterns of the active material powder of Example 5, Comparative Example 3 and Comparative Example 4 are shown respectively by lines A, B and C of FIG. 6. In FIG. 6, "*" indicates Si standard peaks. In FIG. 6, with regard to lattice parameters, a is 2.876 and c is 14.151 in the case of A, a is 2.883 and c is 14.150 in the case of B, and a is 2.872 and c is 14.204 in the case of C. As shown in the drawing, a significantly different XRD pattern results for the active material of Example 5 compared to the XRD pattern of the active material of Comparative Example 4 in which Mg is doped within the structure of the active material, while the XRD pattern of the active material of Example 5 is substantially identical to that of the active material of Comparative Example 3 in which Mg is not doped within the structure of the active material. This indicates that the active material of Example 5 maintains the structure of the prior active material in which Mg is not doped within the active material structure while changing only the surface formation to improve electro-chemical characteristics.

Figure 7:
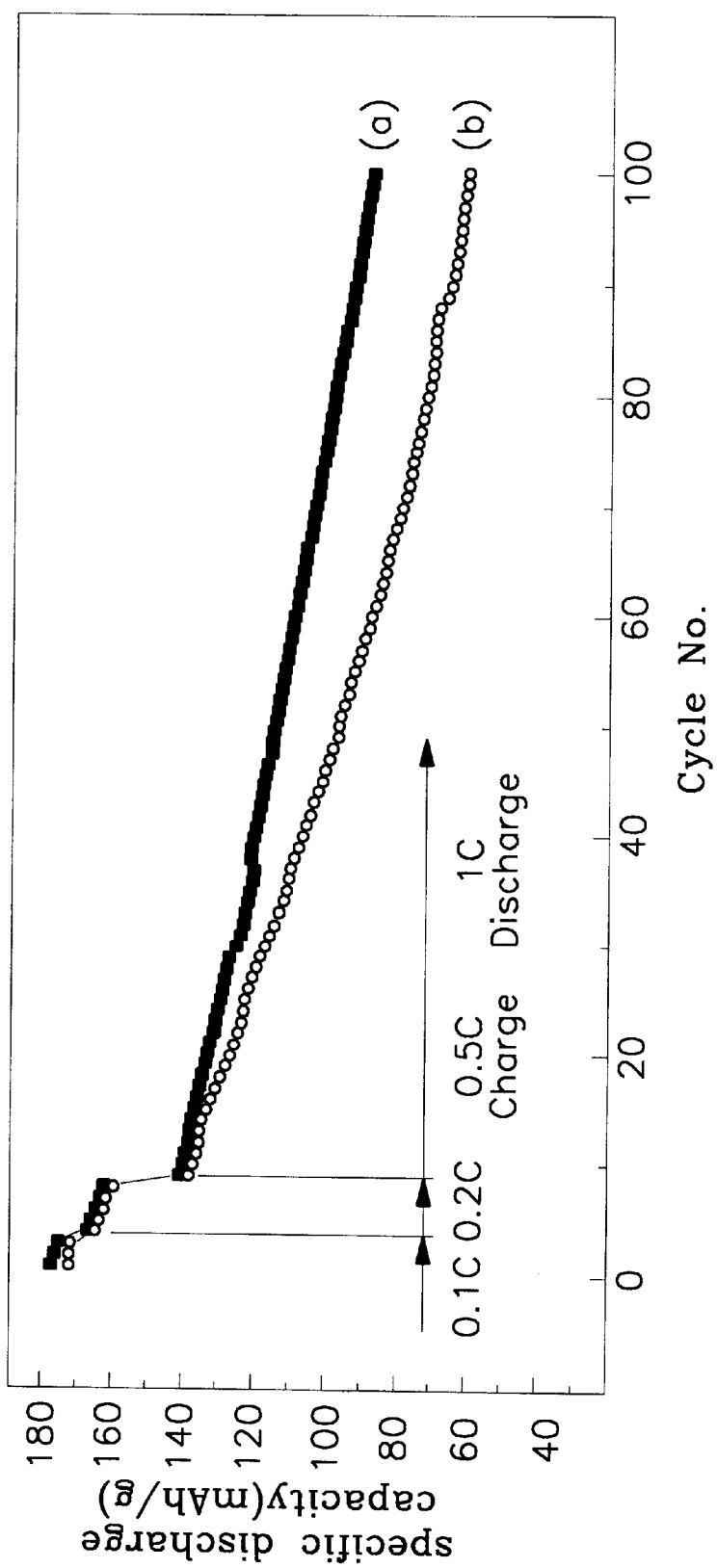
FIG. 7 is a graph illustrating charge and discharge characteristics of a battery to which is applied positive material according to the fifth example and the third comparative example of the present invention.

FIG. 7 shows a graph of electrochemical characteristics of the battery manufactured according to Example 5 and Comparative Example 3 while charge and discharge speeds were changed in a range of 2.8V to 4.3V. In the drawing, line (a) corresponds to Example 5 and line (b) corresponds to Comparative Example 3. As shown in the drawing, although a capacity of the battery of Example 5 reduced from 140 mAh/g to 90 mAh/g, that of Comparative Example 3 reduced from 140 mAh/g to 60 mAh/g. This shows that, at a high charge/discharge rate, the battery using the active material of Example 5 displays a minimal amount of reduction in battery capacity when compared to Comparative Example 3.

Figure 8:
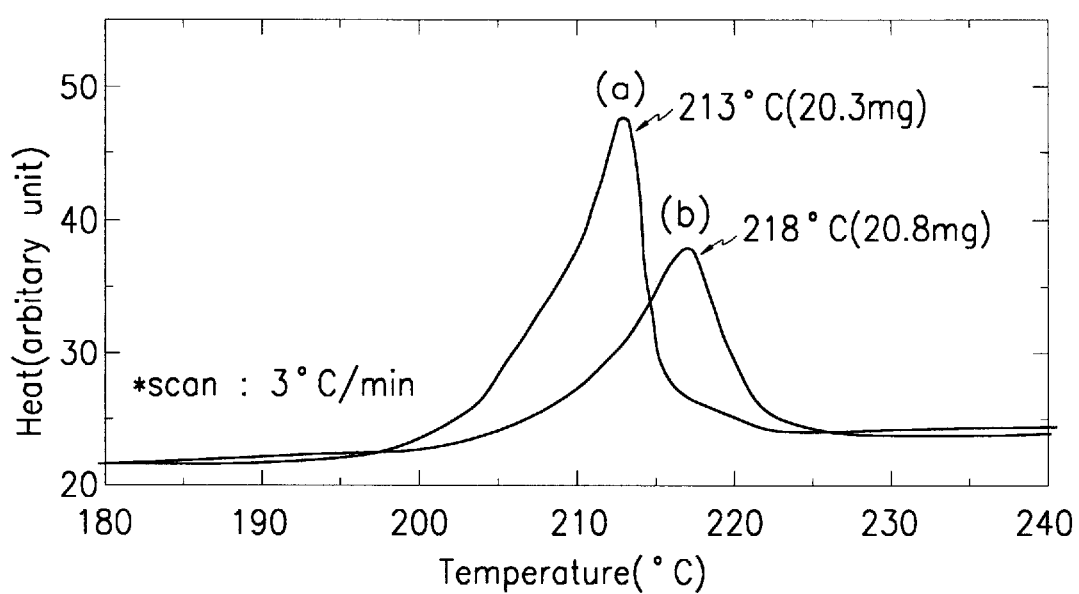
FIG. 8 is a graph illustrating DSC analysis results of a positive plate to which is applied positive material according to a ninth example and a fifth comparative example of the present invention.

Referring now to FIG. 8, shown are DSC analysis results of pole plates removed from the batteries manufactured according to Example 9 (b in the drawing) and Comparative Example 5 (a in the drawing), the batteries having been charged to 4.1V one time before dismantling of the batteries. The DSC analysis was conducted to determine thermal stability of the charged positive electrode active material. $LiCoO_2$, for example, comes to have a structure of $Li_{1-x}CoO_2$ ($0.5 \leq x < 1$) in a charged state. Since active material having this structure is unstable, if the temperature in the battery rises, oxygen combined with metal (i.e., cobalt) becomes separated from the metal. The freed oxygen reacts with the electrolyte in the battery such that it is possible for the battery to explode. Accordingly, an oxygen separation temperature and an amount of heat generation are important factors with regard to the stability of batteries.

As shown in FIG. 8, an oxygen separation temperature of Comparative Example 5 is roughly 213° C., while it is approximately 218° C. for Example 9. Therefore, the oxygen separation temperature for Example 9 is about 5° C. higher than that for Comparative Example 5, and a heat generation rate for Example 9 is about half that of Comparative Example 5. Accordingly, with the processing of the surface of $LiCoO_2$ powder with metal alkoxide and the heat-treating of the powder, the metal oxide is formed on the surface of the $LiCoO_2$ such that a crystalline structure of the $LiCoO_2$ is stabilized. That is, since the crystalline structure on the surface of the $LiCoO_2$ is stabilized, it can be assumed that the combination of the cobalt and oxygen is also stabilized. Further, with the formation of a composite metal oxide layer of cobalt and magnesium on the surface of the $LiCoO_2$, any reaction between the positive electrode active material and the electrolyte is suppressed, thereby reducing the oxidation of the electrolyte.

Figure 9:
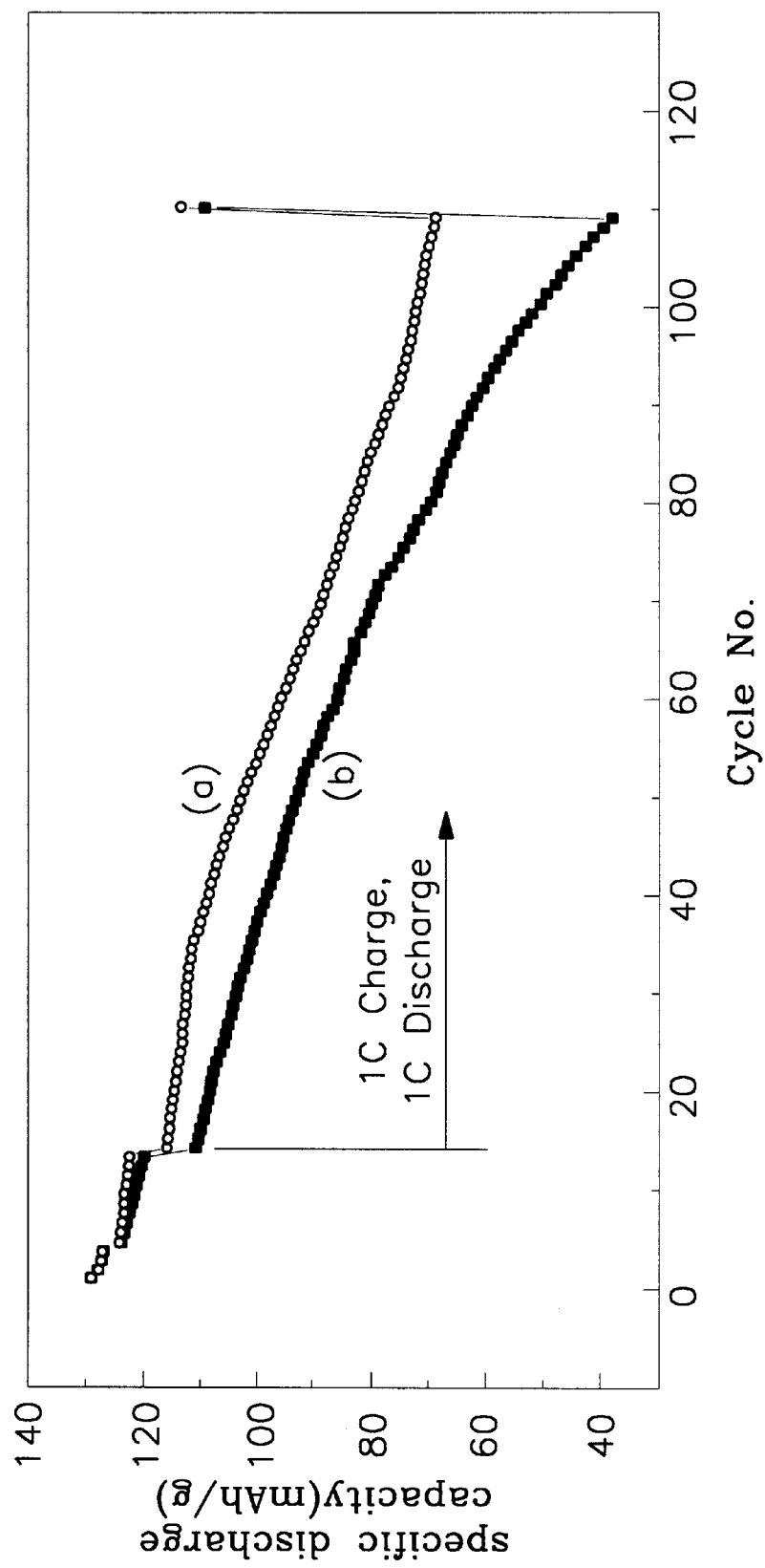
FIG. 9 is a graph illustrating battery characteristics during charging and discharging at a level of voltage between 2.75V and 4.1V of a battery to which is applied positive material according to the ninth example and the fifth comparative example.

FIG. 9 shows a graph of battery characteristics during charging and discharging at a level of voltage between 2.75V and 4.1V of the battery according to Example 9 and Comparative Example 5. In the drawing, (a) corresponds to the battery of Example 9, while (b) corresponds to the battery of Comparative Example 5. In the case of Comparative Example 5, during 100 cycles charged and discharged to 1C, the capacity of the battery is reduced from 108 mAh/g to 38 mAh/g (a reduction of 65%), whereas the capacity of the battery of Example 9 is reduced from 114 mAh/g to 70 mAh/g (a reduction of 39%). Accordingly, relative to Comparative Example 5, the reduction in capacity is considerably smaller at a high rate of charge/discharge and a cycle life is significantly greater for Example 9.

Figure 10:
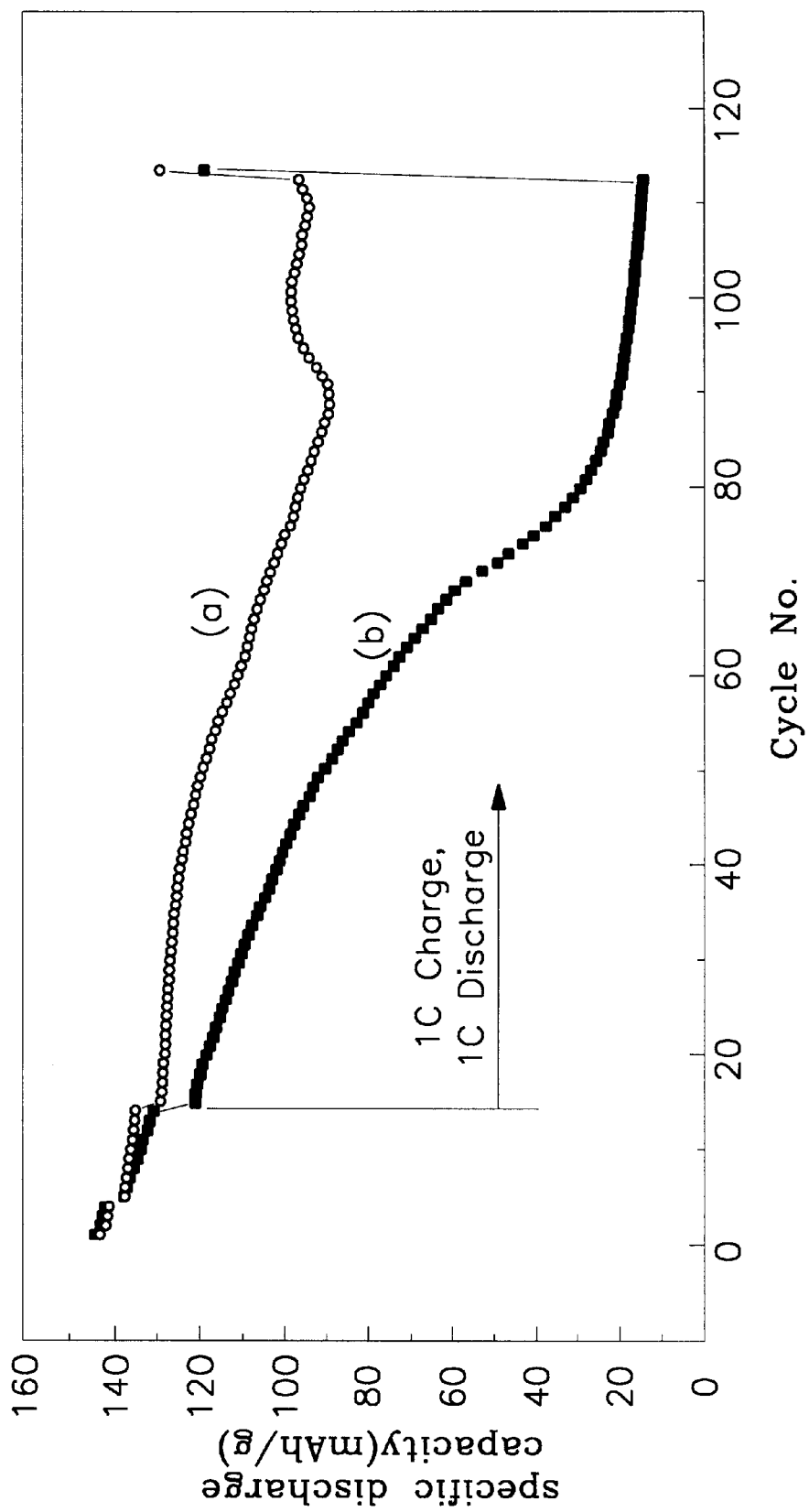
FIG. 10 is a graph illustrating battery characteristics during charging and discharging at a level of voltage between 2.75V and 4.2V of a battery to which is applied positive material according to the ninth example and the fifth comparative example.

FIG. 10 shows a graph of battery characteristics during charging and discharging at a level of voltage between 2.75V and 4.2V of the battery according to Example 9 and Comparative Example 5. In the drawing, (a) corresponds to the battery of Example 9 and (b) corresponds to the battery of Modified Example 5. In the case of Comparative Example 5, during 100 cycles charged and discharged to 1C, the capacity of the battery is reduced from 120 mAh/g to 15 mAh/g (a reduction of 88%), whereas the capacity of the battery of Example 9 is reduced from 129 h/g to 96 mAh/g (a reduction of 26%). Accordingly, relative to Comparative Example 5, the reduction in capacity is considerably smaller at a high rate of charge/discharge and a cycle life is significantly greater for Example 9.

Figure 11:
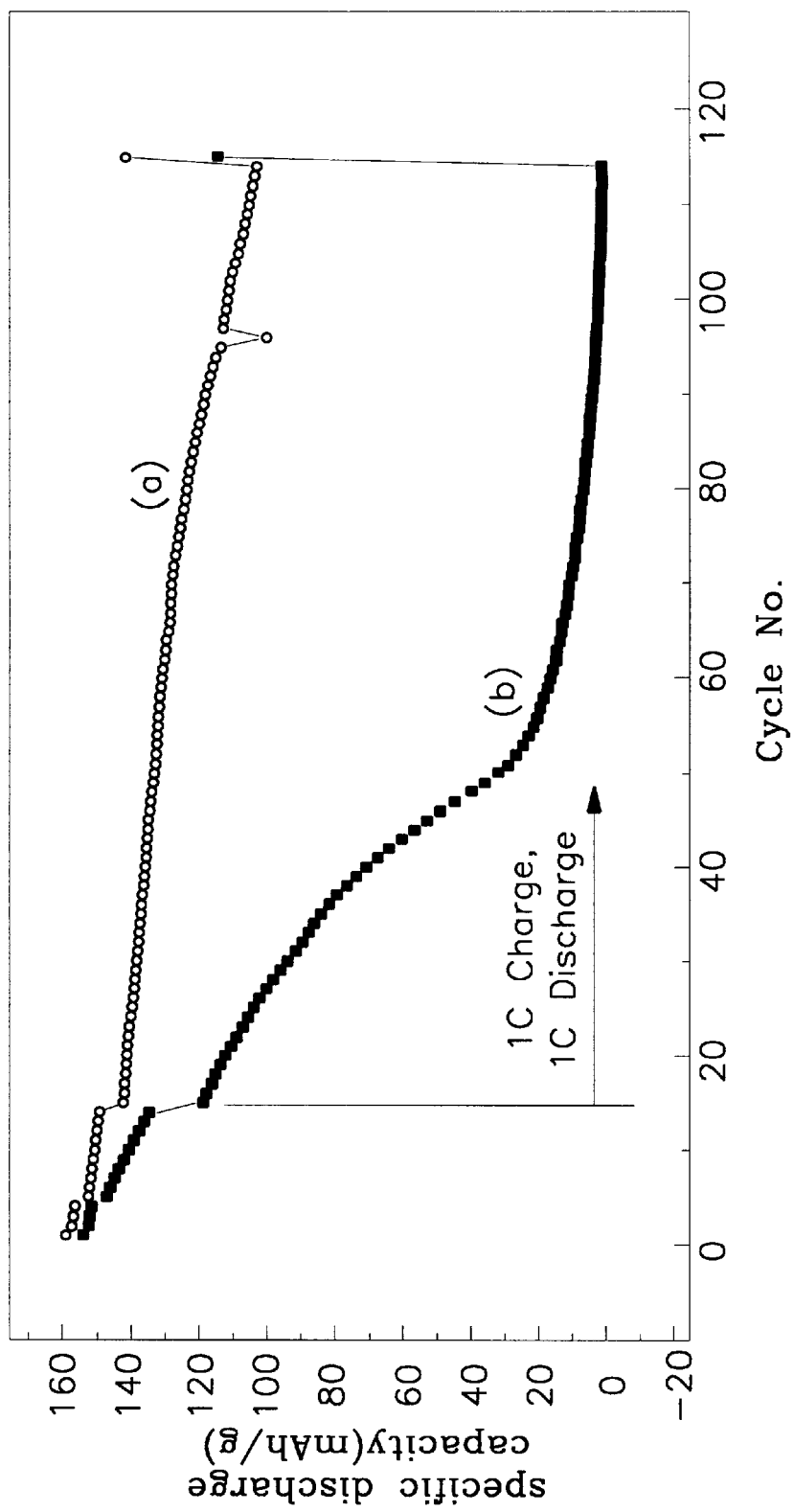
FIG. 11 is a graph illustrating battery characteristics during charging and discharging at a level of voltage between 2.75V and 4.3V of a battery to which is applied positive material according to the ninth example and the fifth comparative example.

FIG. 11 shows a graph of battery characteristics during charging and discharging at a level of voltage between 2.75V and 4.3V of the battery according to Example 9 and Comparative Example 5. In the drawing, (a) corresponds to the battery of Example 9 and (b) corresponds to the battery of Modified Example 5. Accordingly, relative to Comparative Example 5, the reduction in capacity is considerably smaller at a high rate of charge/discharge and a cycle life is significantly greater for Example 9.

Figure 12:
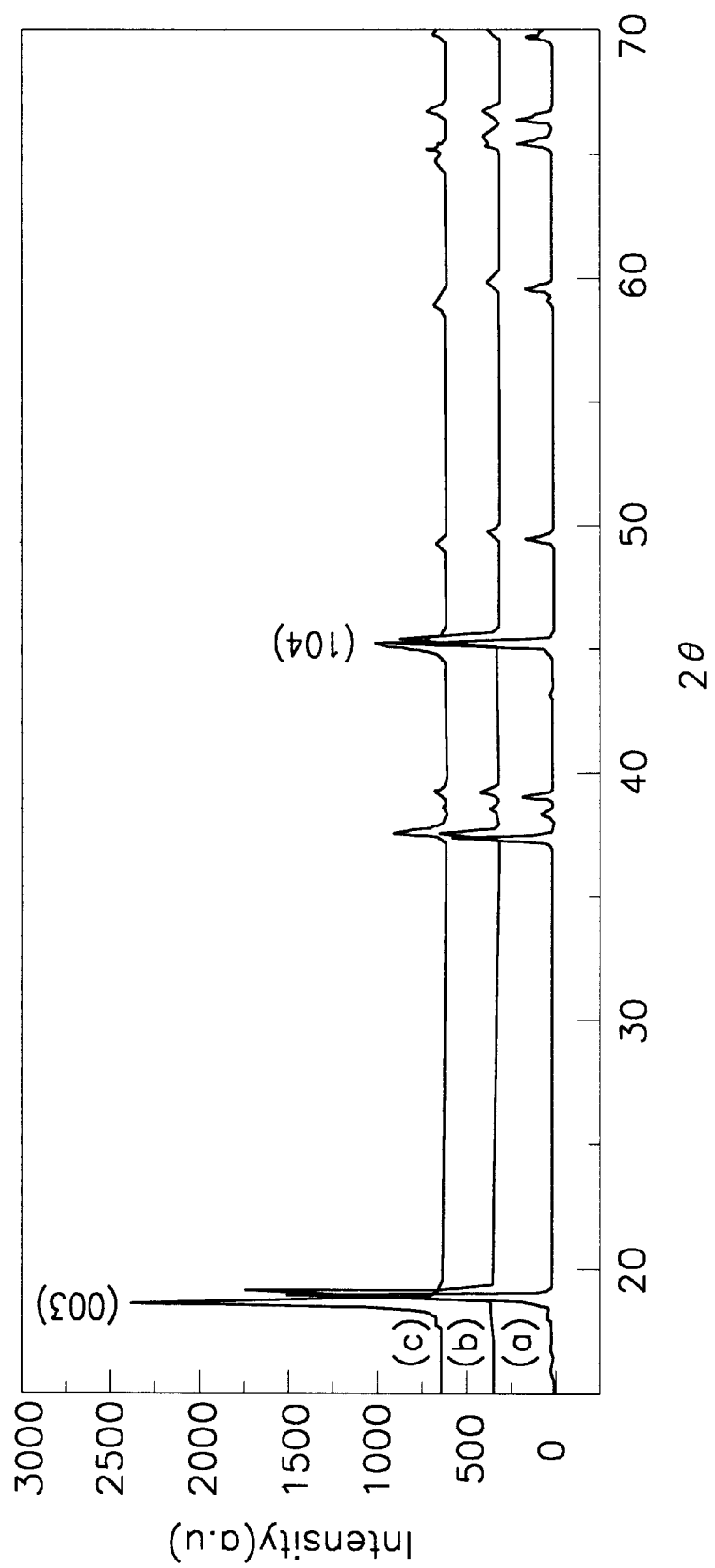
FIG. 12 is a graph illustrating XRD patterns of active material for a positive electrode used in secondary lithium batteries according to a tenth example and the fifth comparative example of the present invention.

Referring to FIG. 12, (a) illustrates XRD analysis results of the $LiCoO_2$ positive electrode active material manufactured according to Comparative Example 5, (b) illustrates XRD analysis results of a pole plate of the battery of Example 10 after the battery has been charged to 4.2V for 1 cycle, and (c) illustrates XRD analysis results of a pole plate of, the battery of Comparative Example 5 after the battery has been charged one time to 4.2 V. As shown in (a) and (c) of the drawing, it can be known that as a result of charging, the structure of $LiCoO_2$ changes from a hexagonal structure to a monoclinic structure (reference, J. Electro. Chem. Soc. Vol. 143, No. 3, 1006, p. 1115-). On the other hand, the $LiCoO_2$ powder of Example 10 maintains its hexagonal structure even after charging, indicative of a stable surface obtained as a result of the coating of the magnesium oxide.

Figure 13:
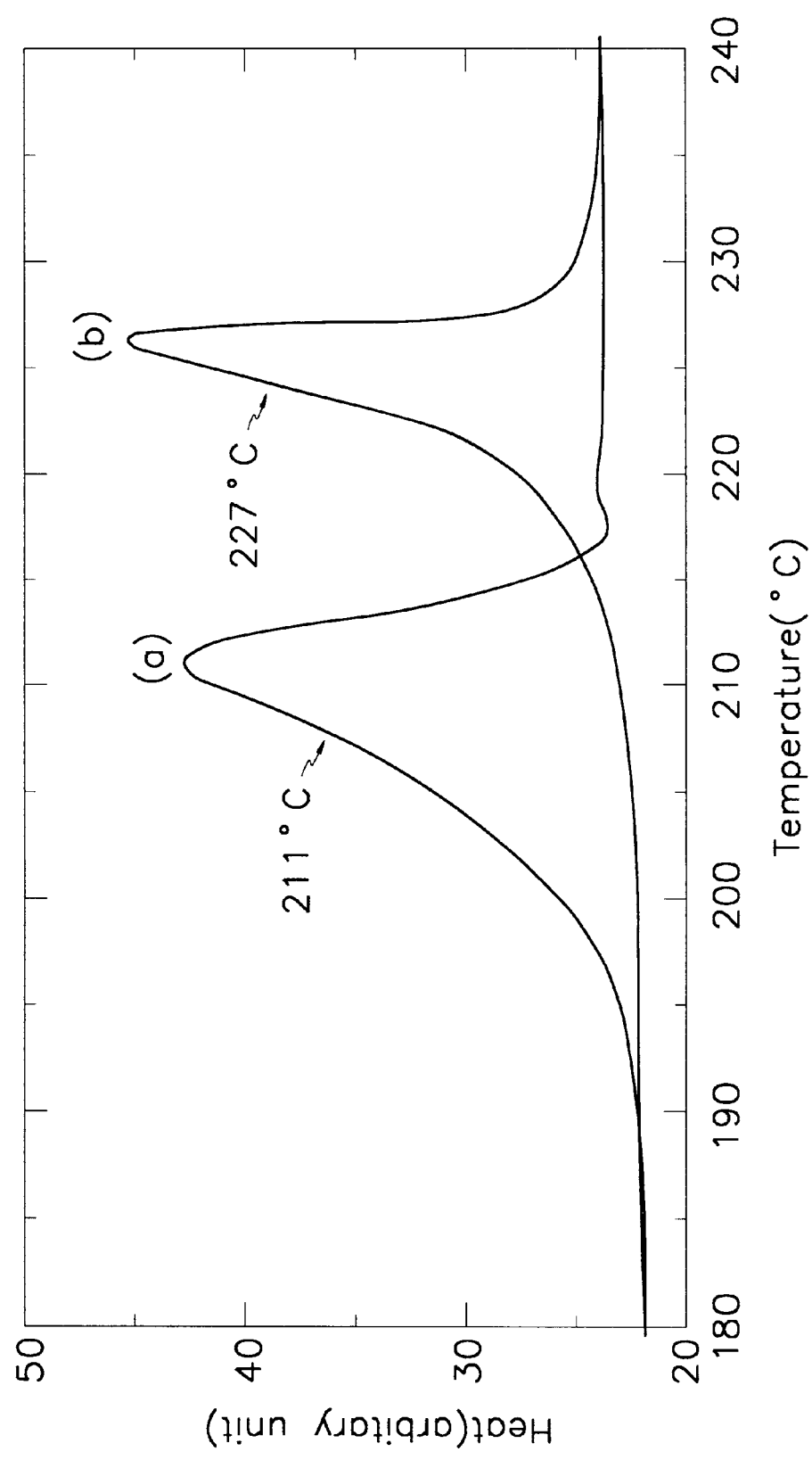
FIG. 13 is a graph illustrating DSC analysis results of a positive plate after charged to 4.2V to which is applied positive material according to the tenth example and the fifth comparative example of the present invention.

Referring to FIG. 13, (b) in the drawing illustrates DSC analysis results of a pole plate of the battery of Example 10 after the battery has been charged one time to 4.2 V, and (a) in the drawing illustrates, DSC analysis results of a pole plate of the battery of Comparative Example 5 after the battery has been charged one time to 4.2 V. As shown in the drawing, a temperature of a heat generation reaction caused by the separation of oxygen is 211° C. for Comparative Example 5, while it is 227° C. for Example 10. Accordingly, Example 10 has a roughly 16° C. higher oxygen separation temperature than Comparative Example 5.

Figure 14:
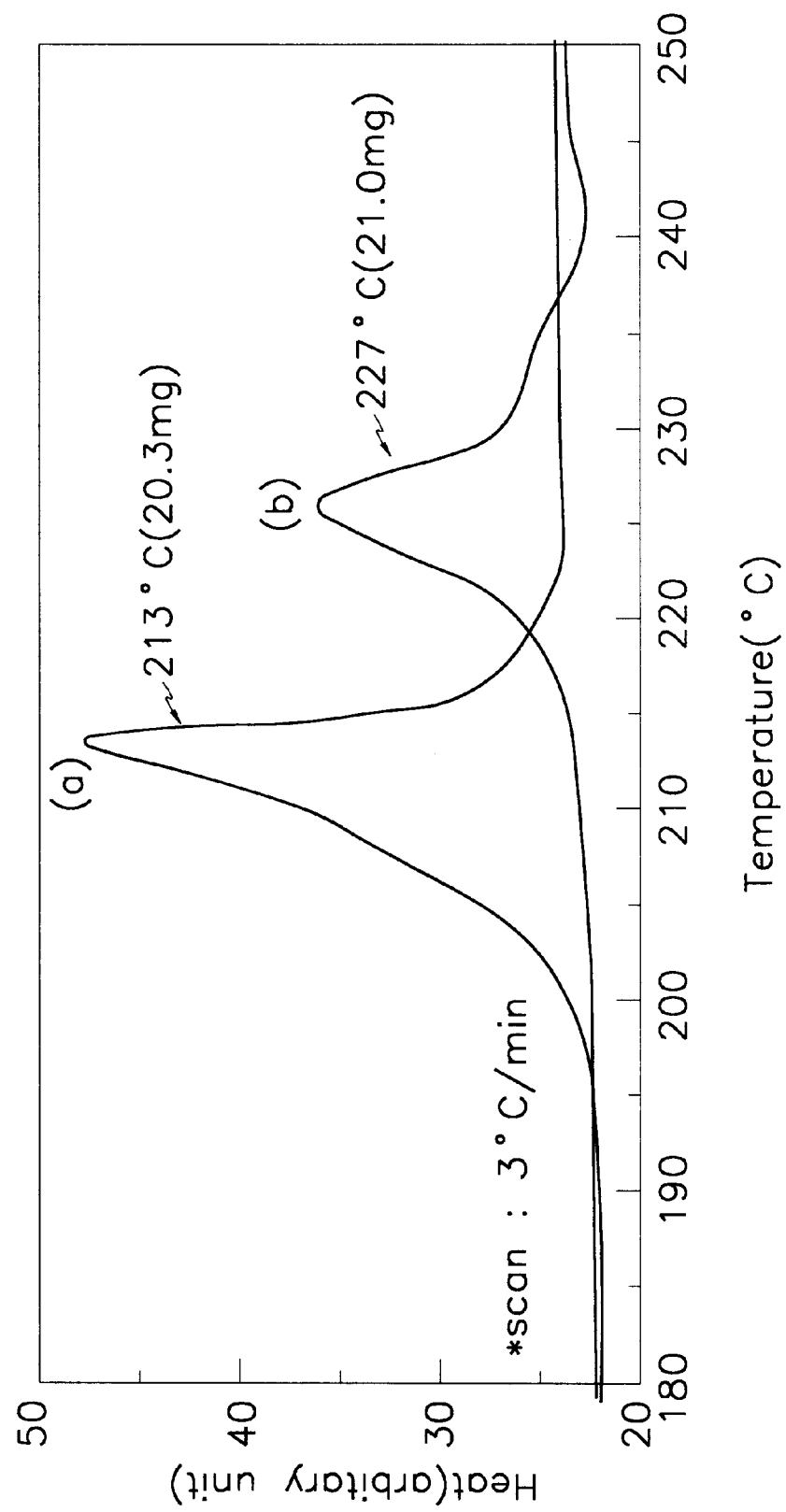
FIG. 14 is a graph illustrating DSC analysis results of a positive plate after charged to 4.1V to which is applied positive material according to the tenth example and the fifth comparative example of the present invention.

In FIG. 14, (b) illustrates DSC analysis results of a pole plate of the battery of Example 10 after the battery has been charged one time to 4.1V, and (a) in the drawing illustrates DSC analysis results of a pole plate of the battery of Comparative Example 5 after the battery has been charged one time to 4.1V. As shown in the drawing, a temperature of a heat generation reaction caused by the separation of oxygen is 213° C. for Comparative Example 5, while it is 227° C. for Example 10. Accordingly, Example 10 has a roughly 15° C. higher oxygen separation temperature than Comparative Example 5, and the heat generation amount for Example 10 is about half that of Comparative Example 5.

Figure 15:
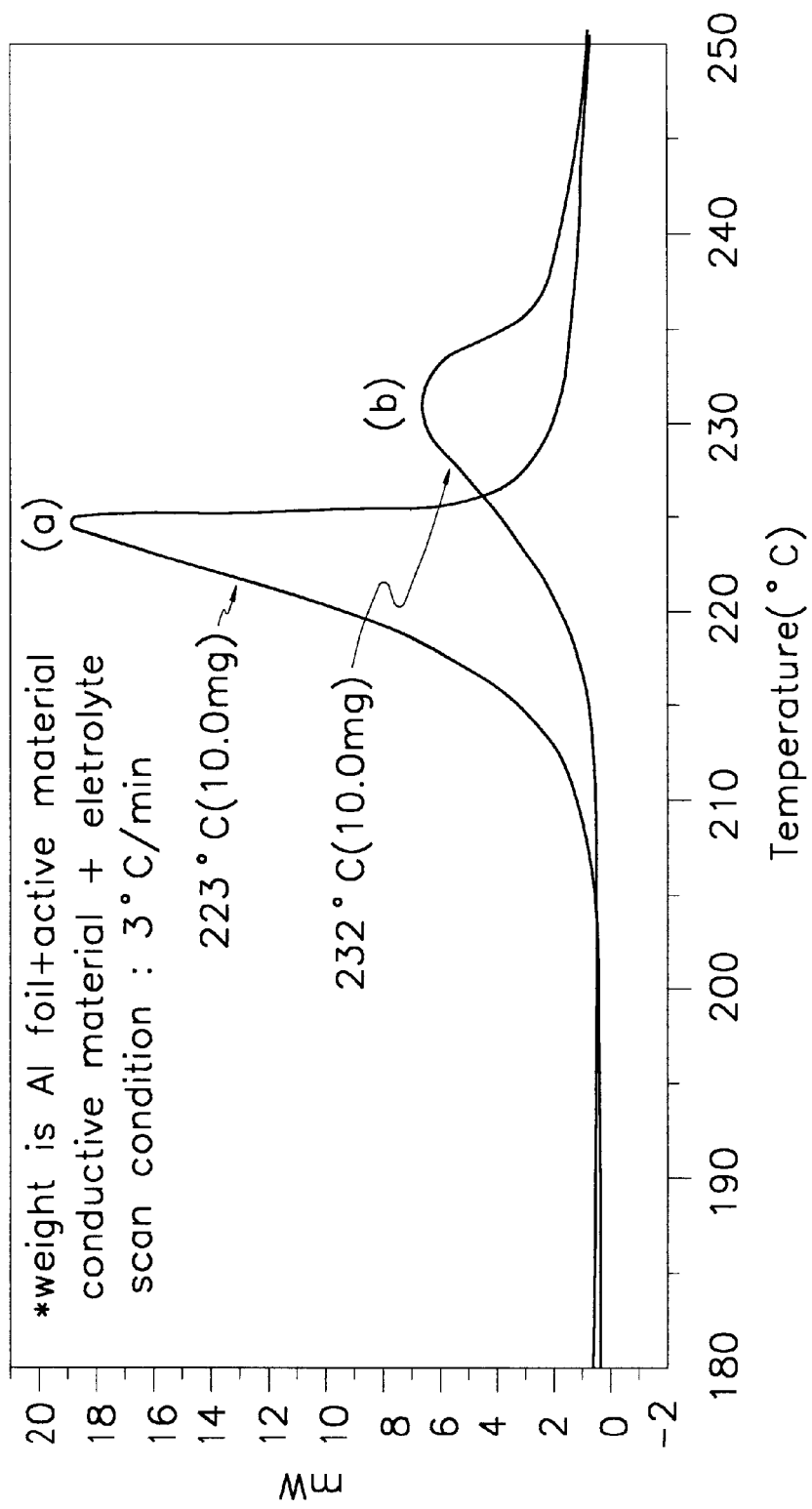
FIG. 15 is a graph illustrating DSC analysis results of a positive plate to which is applied positive material according to an eleventh example and a sixth comparative example of the present invention.

Referring to FIG. 15, (b) illustrates DSC analysis results of a pole plate of the battery of Example 11 after the battery has been charged one time to 4.1V, and (a) in the drawing illustrates DSC analysis results of a pole plate of the battery of Comparative Example 6 after the battery has been charged one time to 4.1V. As shown in the drawing, a thermal generation amount of approximately 20 mW occurs at 223° C. for Comparative Example 6, and approximately 6 mW occurs at 232° C. for Example 11. Accordingly, Example 11 has a roughly 9° C. higher oxygen separation temperature than Comparative Example 6, and the heat generation amount for Example 11 is about one-third that of Comparative Example 6.

Figure 16:
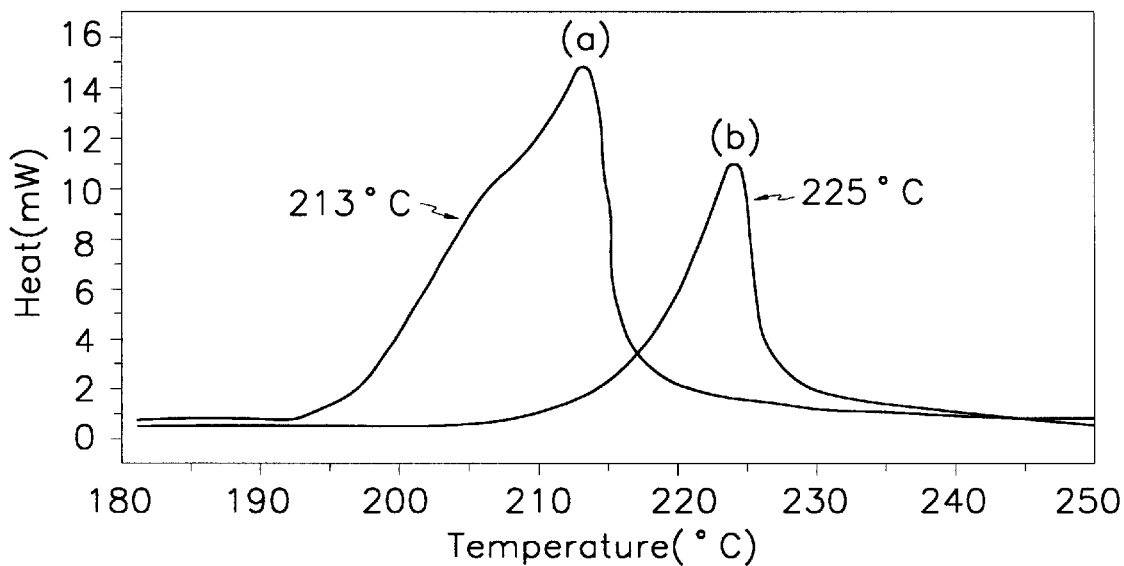
FIG. 16 is a graph illustrating DSC analysis results of a positive plate to which is applied positive material according to a twelfth example and a seventh comparative example of the present invention.

Referring to FIG. 16, (b) illustrates DSC analysis results of a pole plate of the battery of Example 12 after the battery has been charged one time to 4.3V, and (a) in the drawing illustrates DSC analysis results of a pole plate of the battery of Comparative Example 7 after the battery has been charged one time to 4.3V. As shown in the drawing, a thermal generation amount of approximately 15 mW occurs at 213° C. for Comparative Example 7, and approximately 10 mW occurs at 225° C. for Example 12. Accordingly, Example 12 has a roughly 12° C. higher oxygen separation temperature than Comparative Example 6.

Figure 17:
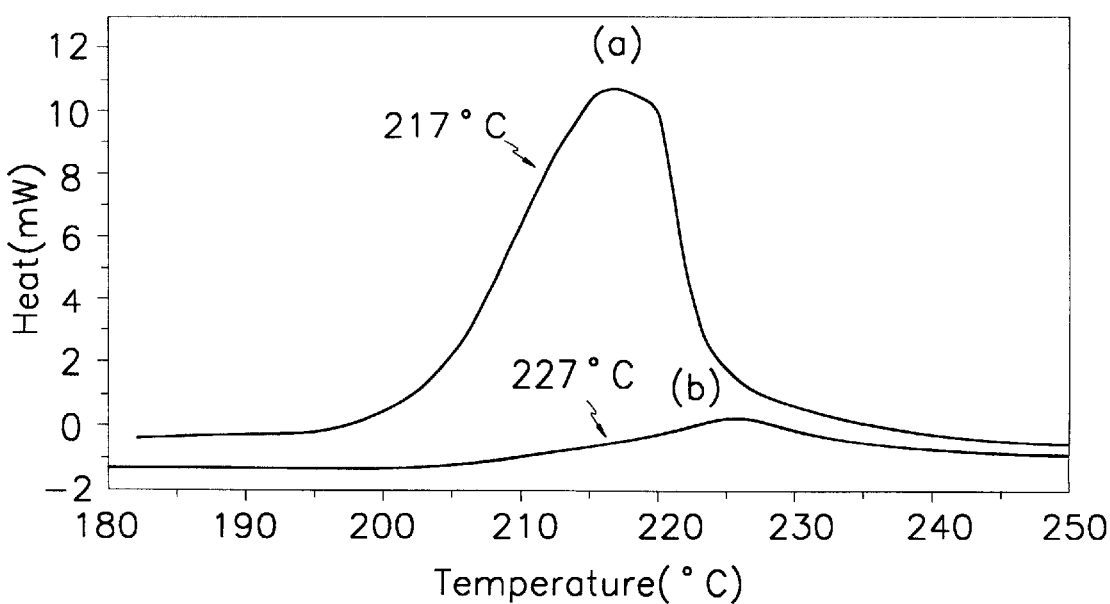
FIG. 17 is a graph illustrating DSC analysis results of a positive plate to which is applied positive material according to a thirteenth example and an eighth comparative example of the present invention.

Referring to FIG. 17, a thermal generation amount of approximately 10 mW occurs at 217° C. for Comparative Example 8, and approximately 2 mW occurs at 227° C. for Example 13. Accordingly, Example 13 has a roughly 10° C. higher oxygen separation temperature than Comparative Example 8, and the heat generation amount for Example 13 is about one-third that of Comparative Example 8.

Figure 18:
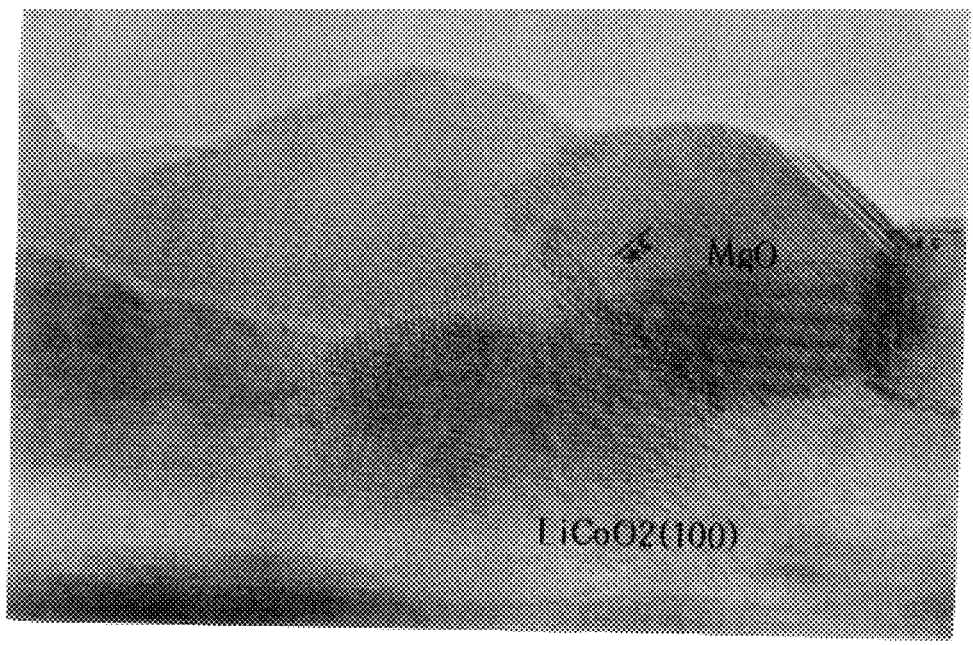
FIG. 18 is a TEM picture of active material according to a fourteenth example of the present invention.

FIG. 18 shows a TEM (tunnel electron microscope) picture of active material according to Example 14. The LiCoO$_2$ active material not coated with metal alkoxide sol is a crystalline material having approximately a 5 μm diameter such that the surface of the material is smooth. However, in the active material of Example 14, which is coated with Mg-alkoxide sol then heat-treated, minute particles of approximately 5–15 nm surround a periphery of LiCoO$_2$, the particles having been excited by a composite of cobalt and magnesium, a metal oxide such as magnesium oxide, etc.

Figure 19:
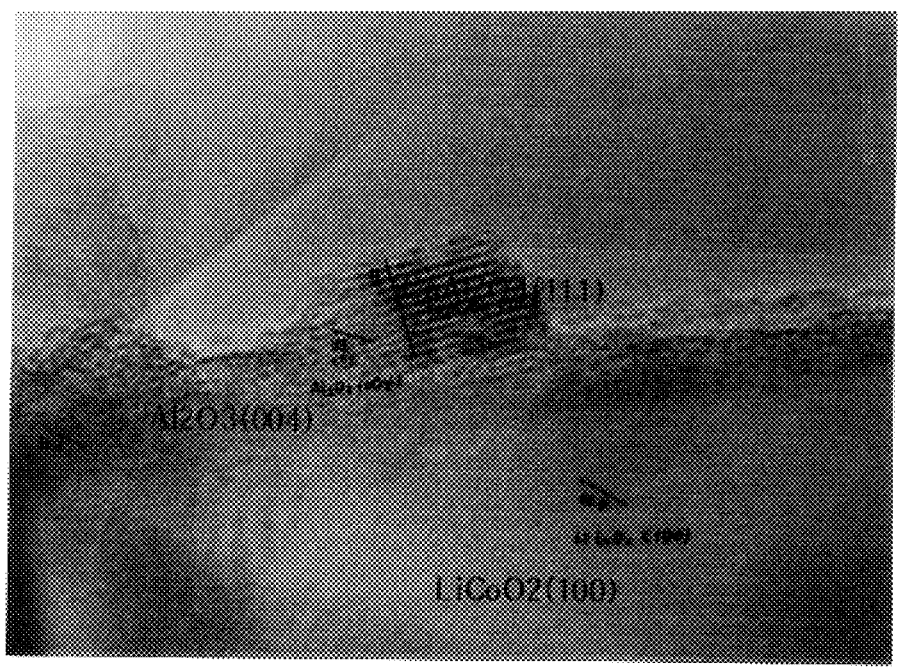
FIG. 19 is a TEM picture of active material according to a fifteenth example of the present invention.

FIG. 19 shows a TEM picture of the active material of Example 15. In Example 15, the active material is coated with Al isopropoxide and heat-treated. As in the drawing, in this active material, a double layer structure excited by a composite metal oxide of cobalt and aluminum or a metal oxide such as aluminum oxide is formed on the surface of the particles of LiCoO$_2$. Accordingly, the active material of the present invention coated with metal alkoxide sol on its surface then heat-treated clearly has a different form compared to the material that is not processed in this manner.

Figure 20:
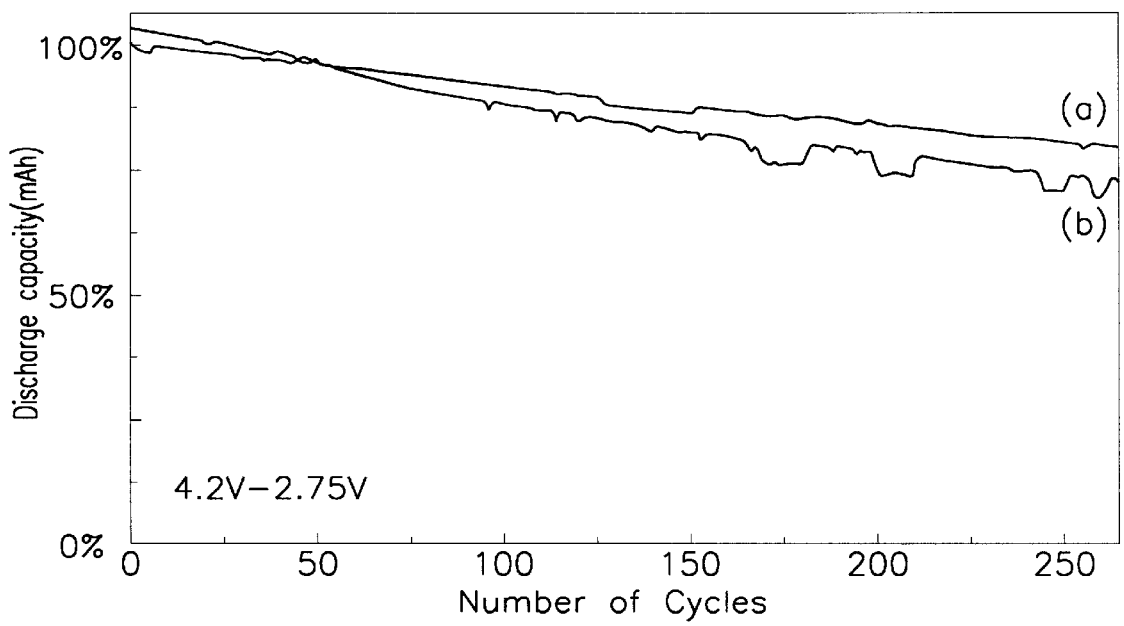
FIG. 20 is a graph illustrating a cycle life of a battery to which is applied active material according to a sixteenth example and a tenth comparative example of the present invention.

FIG. 20 shows a graph of a cycle life of the batteries manufactured according to Example 16 and Comparative Example 10. The batteries of Example 16 and Comparative Example 10 underwent formation at a rate of 0.2C, then were charged/discharged to 1C. In FIG. 20, (a) corresponds to Example 16 and (b) corresponds to Comparative Example 10. In comparing battery life characteristics of the batteries over 250 cycles, the capacity of Comparative Example 10 reduced by approximately 30% compared to its initial capacity, while the capacity of Example 16 reduced by approximately 20% compared to its initial capacity. It is therefore known that the cycle life of Example 16 is superior to that of Comparative Example 10.

Figure 21:
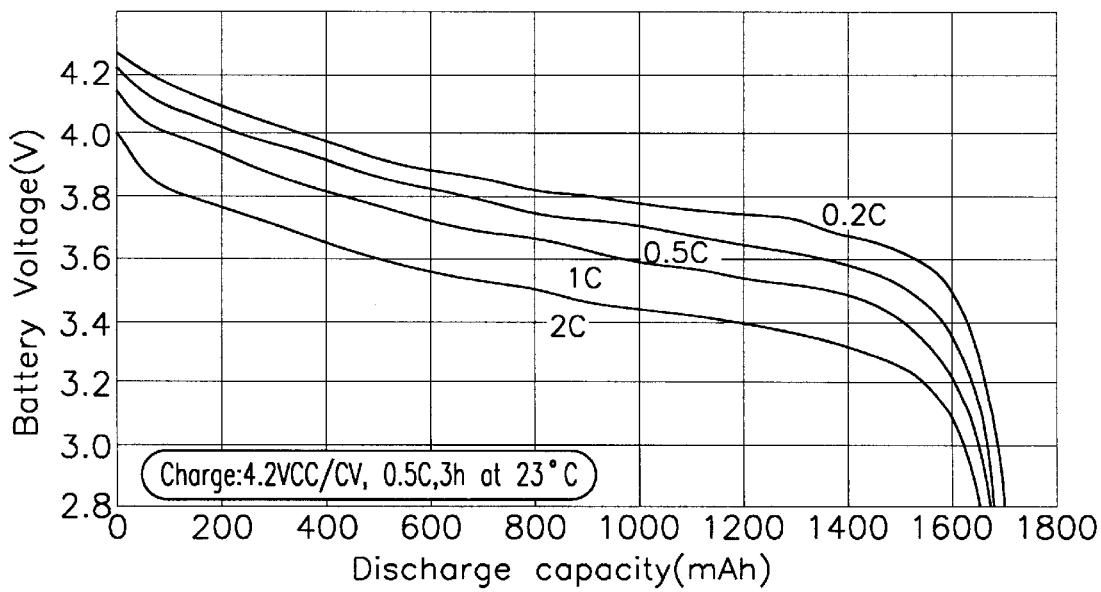
FIG. 21 is a graph illustrating charge and discharge characteristics of a battery to which is applied positive material according to a seventeenth example of the present invention.
Figure 22:
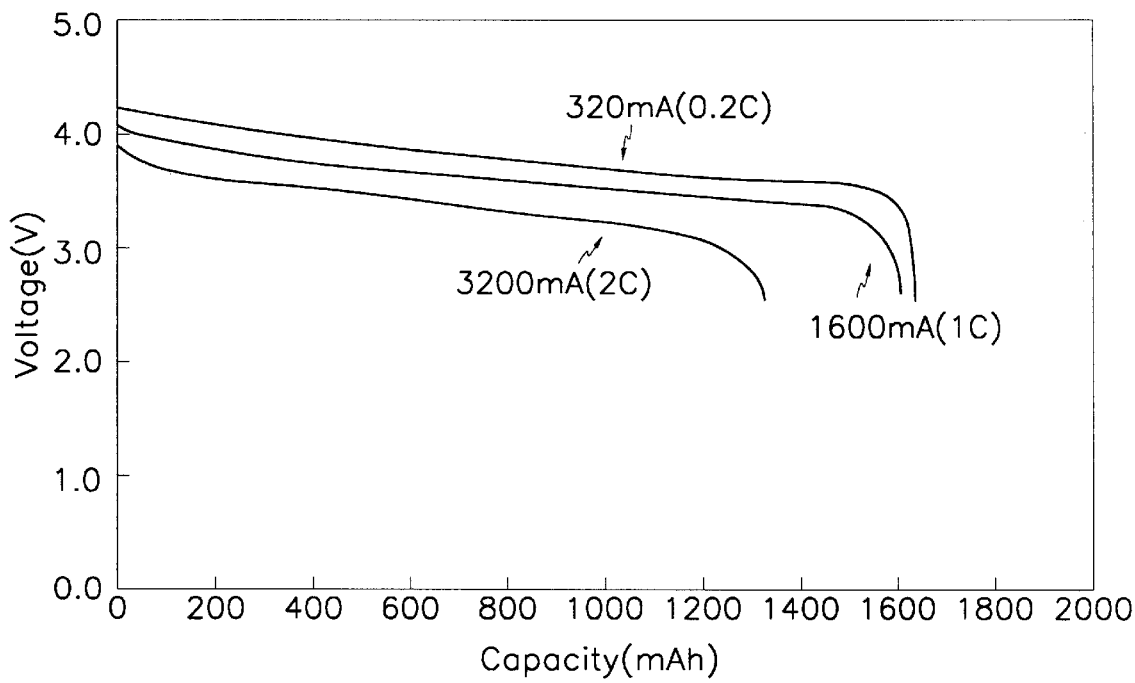
FIG. 22 is a graph illustrating charge and discharge characteristics of a battery to which is applied positive material according to an eleventh comparative example of the present invention.

FIG. 21 shows a graph of charge and discharge characteristics of the battery manufactured according to Example 17. After charging the battery at a rate of 0.5C, a discharge rate of the battery was changed from 0.2C to 0.5C, 1C and 2C to measure battery characteristics. FIG. 22 shows a graph of charge and discharge characteristics of the battery manufactured according to Comparative Example 11. In comparing the charge/discharge characteristics of Example 17 and Comparative Example 11, the characteristics are similar up to 1C, but when reaching 2C, the amount of reduction in capacity for Example 17 is significantly smaller than Comparative Example 11.

Figure 23:
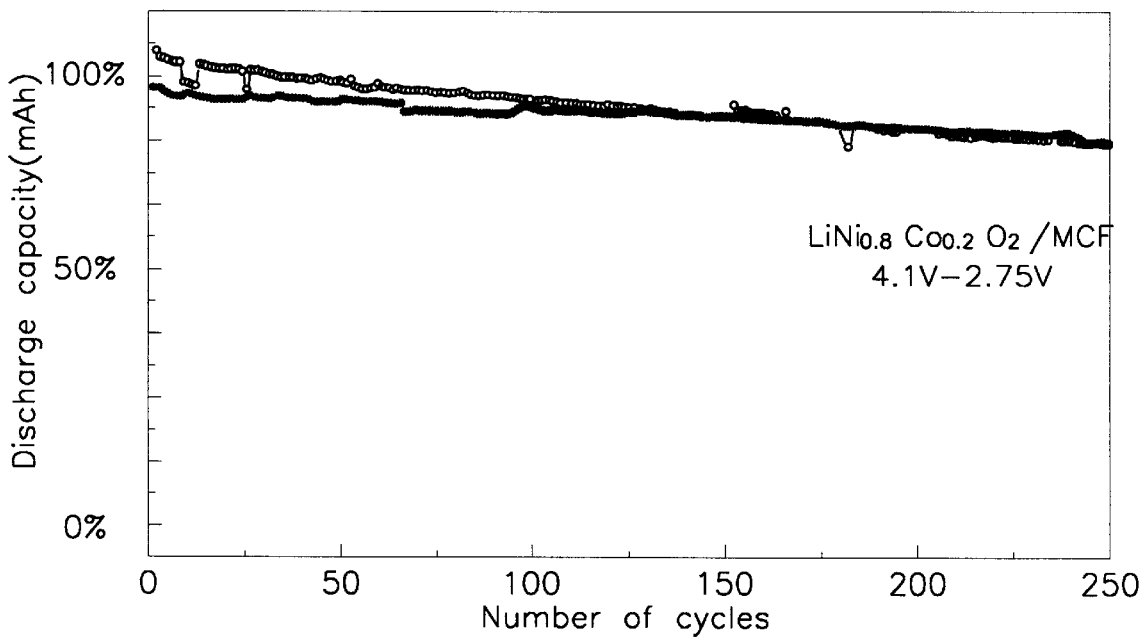
FIG. 23 is a graph illustrating a cycle life of a battery to which is applied active material according to an eighteenth example and a twelfth comparative example of the present invention.

FIG. 23 shows graph of cycle life characteristics of the batteries manufactured according to Example 18 (a in the drawing) and Comparative Example 12 (b in the drawing). As shown in FIG. 23, cycle life characteristics for Example 18 are better than that of Comparative Example 12 up to roughly 100 cycles, after which the characteristics are substantially similar.

Although the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of manufacturing an active material for a positive electrode used in lithium secondary batteries of Formula 1 below, the method comprising the steps of:

producing a crystalline powder or a semi-crystalline powder of Formula 1;

coating the crystalline powder or the semi-crystalline powder with metal alkoxide sol; and heat-treating the powder coated with the metal alkoxide sol, $$LiA_{1-x-y}B_xC_yO_2 \qquad \text{(Formula 1)}$$

where $0<x\leq0.3$, $0\leq y\leq0.01$, and

A is an element selected from the group consisting of Ni, Co and Mn;

B is an element selected from the group consisting of Ni, Co, Mn, B, Mg, Ca, Sr, Ba, Ti, V, Cr, Fe, Cu and Al; and C is an element selected from the group consisting of Ni, Co, Mn, B, Mg, Ca, Sr, Ba, Ti, V, Cr, Fe, Cu and Al.

2. The method of claim 1 wherein the metal alkoxide is selected from the group consisting of Mg, Al, Co, K, Na and Ca.

3. The method of claim 2 wherein the metal alkoxide is Mg-alkoxide.

4. The method of claim 1 wherein a concentration of metal in the metal alkoxide 1–10% by weight of alcohol.

5. The method of claim 1 wherein the heat-treating process is performed at a temperature between 400 and 900° C.

6. The method of claim 1 wherein the positive electrode active material is $LiNi_{1-x}Co_xO_2$, where $0<x\leq0.3$.